US011005179B2

(12) United States Patent
Achour et al.

(10) Patent No.: US 11,005,179 B2
(45) Date of Patent: May 11, 2021

(54) FEED STRUCTURE FOR A METAMATERIAL ANTENNA SYSTEM

(71) Applicant: Metawave Corporation, Palo Alto, CA (US)

(72) Inventors: Maha Achour, Palo Alto, CA (US); George Daniel, Palo Alto, CA (US); Chiara Pelletti, Palo Alto, CA (US); Yan Wang, Palo Alto, CA (US)

(73) Assignee: METAWAVE CORPORATION, Carlsbad, CA (US)

( * ) Notice: Subject to any disclaimer, the term of this patent is extended or adjusted under 35 U.S.C. 154(b) by 177 days.

(21) Appl. No.: 15/996,384

(22) Filed: Jun. 1, 2018

(65) Prior Publication Data

US 2018/0351250 A1 Dec. 6, 2018

Related U.S. Application Data

(60) Provisional application No. 62/515,045, filed on Jun. 5, 2017, provisional application No. 62/591,171, filed on Nov. 27, 2017.

(30) Foreign Application Priority Data

May 1, 2018 (WO) ............... PCT/US2018/030541

(51) Int. Cl.
*H01Q 3/34* (2006.01)
*H01Q 1/36* (2006.01)
(Continued)

(52) U.S. Cl.
CPC ............... *H01Q 3/34* (2013.01); *G01S 7/03* (2013.01); *G01S 7/352* (2013.01); *G01S 13/931* (2013.01);
(Continued)

(58) Field of Classification Search
CPC .... H01Q 3/34; H01Q 21/061; H01Q 15/0086; G01S 13/931; G01S 7/03
(Continued)

(56) References Cited

U.S. PATENT DOCUMENTS 6,492,949 B1 * 12/2002 Breglia ................. G01S 7/4021
343/700 MS
6,768,453 B2    7/2004 Solbach
(Continued)

FOREIGN PATENT DOCUMENTS

| CN | 102365789 A | 2/2012 |
|---|---|---|
| JP | 2016-20899 A | 2/2016 |
| KR | 101527771 B1 | 6/2015 |

OTHER PUBLICATIONS

Guzman-Quiros, Raul et al. "Advances in Electronically Reconfigurable LWAs in Fabry-Pérot and SIW Technologies", 7th European Conference on Antennas and Propagation, EuCAP 2013. 2001-2005.
(Continued)

*Primary Examiner* — Bo Fan
(74) *Attorney, Agent, or Firm* — Haynes and Boone, LLP

(57) ABSTRACT

The present invention is an antenna system having an array of metamaterial cells and a transmission array having a plurality of slots, wherein a signal propagates through the transmission array to the metamaterial cells and radiates a beamform. The system further includes reactance control means to adjust a phase of the beamform and to perform beam steering and beam switching.

14 Claims, 14 Drawing Sheets

(51) Int. Cl.
  *H01Q 13/10* (2006.01)
  *G01S 7/35* (2006.01)
  *H01Q 1/32* (2006.01)
  *H01Q 21/06* (2006.01)
  *G01S 13/931* (2020.01)
  *G01S 7/03* (2006.01)
  *H01Q 15/00* (2006.01)
  *H01Q 21/00* (2006.01)
  *G01S 7/41* (2006.01)
  *G01S 13/02* (2006.01)
  *G01S 13/32* (2006.01)

(52) U.S. Cl.
  CPC .......... *H01Q 1/3233* (2013.01); *H01Q 1/364* (2013.01); *H01Q 13/10* (2013.01); *H01Q 15/0086* (2013.01); *H01Q 21/0037* (2013.01); *H01Q 21/061* (2013.01); *H01Q 21/064* (2013.01); *G01S 7/032* (2013.01); *G01S 7/412* (2013.01); *G01S 7/417* (2013.01); *G01S 13/32* (2013.01); *G01S 2013/0245* (2013.01); *G01S 2013/0254* (2013.01)

(58) Field of Classification Search
  USPC .......................................................... 342/195
  See application file for complete search history.

(56) References Cited

U.S. PATENT DOCUMENTS

| | | | |
|---|---|---|---|
| 7,250,908 B2 | 7/2007 | Lee | |
| 8,633,866 B2 | 1/2014 | Sarabandi et al. | |
| 8,754,810 B2 | 6/2014 | Guo et al. | |
| 9,545,923 B2* | 1/2017 | Casse | B60W 30/14 |
| 9,786,986 B2 | 10/2017 | Johnson et al. | |
| 2016/0011307 A1* | 1/2016 | Casse | G01S 13/931 701/93 |
| 2016/0013531 A1* | 1/2016 | Casse | H01P 1/184 333/161 |
| 2016/0061935 A1 | 3/2016 | McCloskey et al. | |
| 2016/0134022 A1 | 5/2016 | Alexopoulos et al. | |
| 2016/0233588 A1 | 8/2016 | Bily et al. | |

OTHER PUBLICATIONS

Wang, Yifu et al. "Tunable I-shaped metamaterial by loading varactor diode for reconfigurable antenna", Applied Physics A, May 26, 2011, 1243-1247.

Zhang, Miao et al. "Design of a Double-Layer Slotted Waveguide Array with a Partially Corporate Feed Circuit Installed in the Bottom Layer and its Fabrication by Diffusion Bonding of Laminated Thin Plates in 38GHz Band" The 2009 International Symposium on Antennas and Propogation, ISAP 2009, Oct. 20-23. 373-376.

Koch, R. et al. "Detection and Purging of Specular Reflective and Transparent Object Influences in 3D Range Measurements," ISPRS—International Archives of the Photogrammetry, Remote Sensing and Spatial Information Sciences, vol. XLII-2/W3, 2017, pp. 377-384.

Mhih, V. et al. "Human-level control through deep reinforcement learning," Nature 518, pp. 529-533, Feb. 2015.

Limberger, F. et al. "Real-Time Detection of Planar Regions in Unorganized Point Clouds," Pattern Recognition, 48(6), pp. 2043-2053, Jun. 2015.

Seyfioglu, M. S., et al. "Deep Convolutional Autoencoder for Radar-Based Classification of Similar Aided and Unaided Human Activities," IEEE Transactions on Aerospace and Electronic Systems, vol. 54, issue 4, pp. 1709-1723, Aug. 2018.

Zhou, Y. et al. "VoxelNet: End-to-End Learning for Point Cloud Based 3D Object Detection," arXiv: 1711.06396 [cs.CV], p. 1-10, Nov. 2017.

* cited by examiner

FEED STRUCTURE FOR A METAMATERIAL ANTENNA SYSTEM

PRIORITY CLAIM

This application claims priority to: U.S. Provisional Patent Application No. 62/515,045 entitled "INTELLIGENT ANTENNA METAMATERIAL METHOD AND APPARATUS," by Maha Achour, filed Jun. 5, 2017; U.S. Provisional Patent Application No. 62/591,171 entitled "METHOD AND APPARATUS FOR REACTANCE CONTROL IN A TRANSMISSION LINE," by George Daniel, filed Nov. 27, 2017; and PCT Patent Application No. PCT/US18/30541 entitled "INTELLIGENT ANTENNA METAMATERIAL METHOD AND APPARATUS," by Maha Achour, filed May 1, 2018, each of which is hereby incorporated by reference.

FIELD OF THE INVENTION

The present invention relates to intelligent antennas using metamaterial structures using dynamic control of the metamaterial unit cells for radar systems.

BACKGROUND

Antennas used in everyday life for communication systems, sensing devices, radar systems and so forth, as they are able to act as sensors and transducers to convert between electric signals and electromagnetic waves. The design of an antenna considers matching, radiation pattern performance, size and shape, as well as other electrical and manufacturability considerations. Each antenna has a feed to provide the signals for transmission, wherein the feed is designed to mitigate its impact on the performance criteria of the antenna.

BRIEF DESCRIPTION OF THE FIGURES

Embodiments of the present invention are described with respect to the figures. These are not drawn to scale and are drawn to clearly identify what applicant claims as the invention.

DETAILED DESCRIPTION

Figure 1:
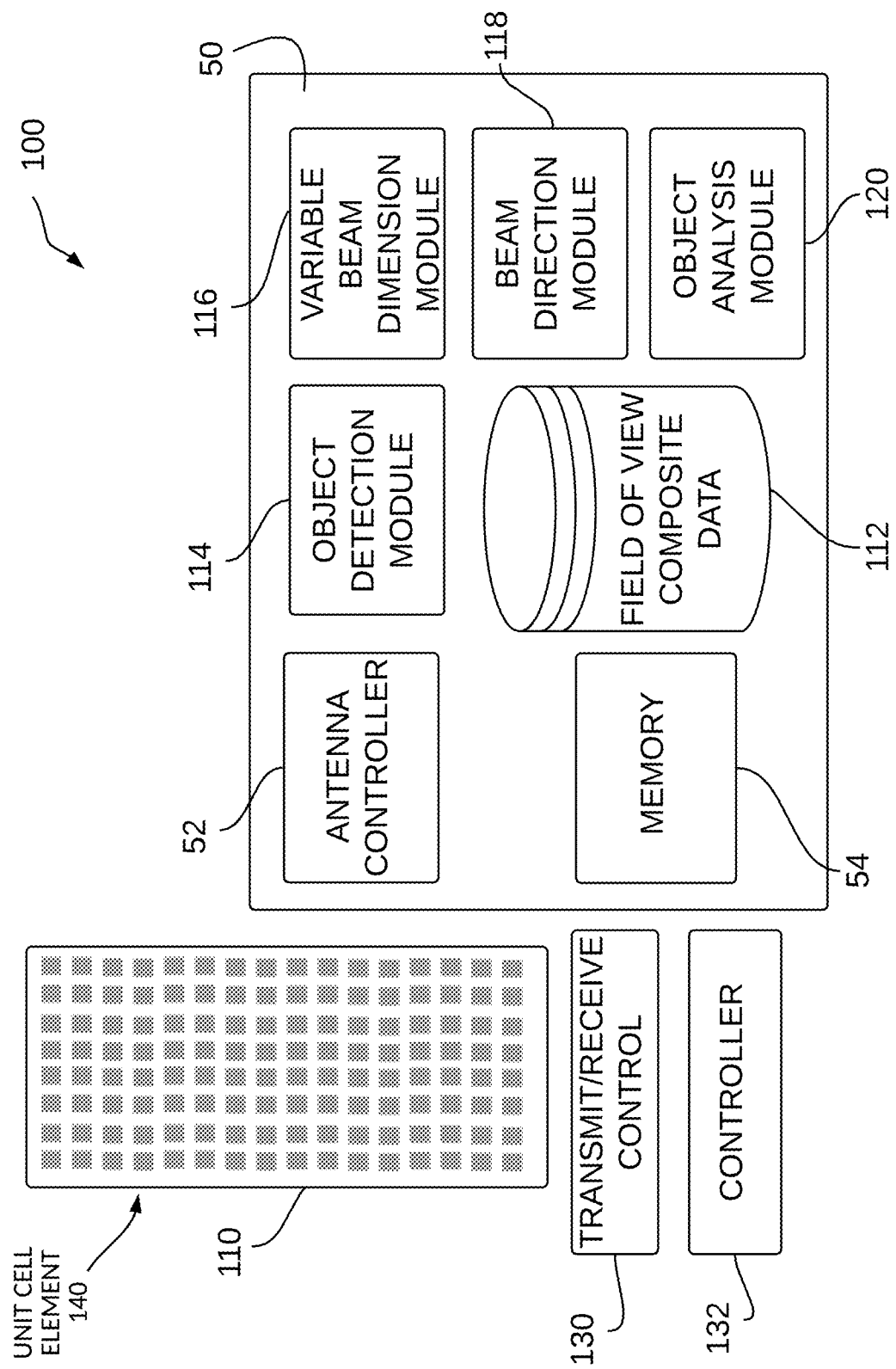
FIG. 1 illustrates an antenna system, according to embodiments of the present invention.

The trend in wireless communication, radar sensing and other applications incorporating an antenna is to provide faster results with less processing power and higher resolution. For example, in mobile wireless devices there is a need for additional connectivity and increased capacity and through put. In radar, there is a need for finer resolution, longer range and reduced processing times. Critical in these processes is the over-the-air capabilities of a device. In addition to the traditional wireless applications, recent developments in Radio Frequency (RF) harvesting, cognitive radio, medical solutions and others. In all of these applications, antenna design is meant to be agile and adapt to different usage models and activities. To achieve these goals, antenna systems are designed with (MIMO) Multi-Input/Multi-Output capabilities, wherein each system dictates the type of antenna feed(s) to use, such as microstrip, probe, aperture coupling, proximity coupling and so forth, and each feed type has design parameters that impact coupling, matching, polarization, gain, bandwidth, and power output of the antenna system. These challenges require new antenna technology and lead to new applications for wireless implementations.

The antenna discussed herein is a metamaterial device having a controllable reactance behavior and the feed to said antenna. The antenna may be constructed as part of the antenna system and couples to the radiating portion(s) of the antenna. In a metamaterial antenna the feed is required to feed multiple unit cells of the antenna array, requiring separate feed lines or transmission lines to one or more locations of the array. This may be done through a corporate feed, a power divider circuit and so forth. In the present invention, a feed has a plurality of transmission lines having discontinuities that feed the signal for transmission to the radiating elements of the antenna array. The transmission lines are designed for signal propagation, wherein the signal then radiates through discontinuities to feed the radiating elements of the antenna array, the metamaterial unit cells. In this way, the antenna array effectively re-radiates the signal.

The feed is designed to achieve a desired beamforming and beam shifting capability, and is defined by bandwidth, azimuth angle range, elevation angle range, gain, and output power. Antenna designs are to be light weight, low profile, low cost, as well as to be easily integrated and fabricated. The transmission lines are positioned proximate the antenna array and configured as a function of the desired behavior of the antenna array.

In radar applications there is recent attention given to autonomous, or self-driving, vehicles. The designs and products contemplated today do not consider all the weather conditions, power consumption constraints and timing required for effective control of a vehicle. As autonomous driving moves from the realm of science fiction to an achievable reality there is a need to provide a sensing system that works over the range of road, weather, temperature, visibility, traffic conditions and so forth, while maintaining consistent reliable service. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on. The use of metamaterial structures enables flexibility in design and configuration, including the introduction of novel feed structures.

An aspect of making this work is the ability to detect and classify objects in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

In addition to moving vehicles and devices, the present invention presents metamaterial antenna arrays for infrastructure and stationary structures to facilitate additional views, information and warnings to a moving vehicle. The antenna arrays are positioned to scan the area around them and identify objects as a complementary source of information for the vehicle. In addition, these fixed radar systems are flexible and responsive; they may be used to alert to severe weather conditions, such as flooding or snow, they may anticipate actions of a pedestrian or vehicle, and they may predict traffic congestion, alert to safety and/or security concerns, and act as a digital eye for the surrounding area. This information may be used as feedback to the vehicle, to the infrastructure control, to environmental agencies and so forth. In some examples, the radar detects traffic levels and then uses this information to provide real time data to the traffic controls, such as traffic signals. These digital eyes may respond to requests from throughout the environment, such as to interface with Internet of Things (IoT) devices.

The proliferation of devices and sensors enables rapid responses over a range of applications. For example, a radar sensor applied to a traffic light would be able to detect bicycles and pedestrians in specific locations and lanes. The MTM radar may use a coarse scan for such identification. Similarly, MTM radar in operation to detect conditions on highways communicates with the vehicle's GPS and provides advance warning of an upcoming exit or lane change. Similarly, an MTM radar sensor near a fueling location may provide an indication to vehicles that this is the last fueling station for a given distance and provide directions for fueling.

The present invention describes an antenna system having an antenna configured with metamaterial (MTM) cells and controlled by an Intelligent Antenna MTM interface controller or antenna controller. The antenna system may be used in applications including cellular communication networks, vehicle-to-vehicle communication systems, object detection systems, autonomous vehicle sensor systems, drone control and communication systems, and so forth. The MTM antenna structure is dynamically controlled by the IAM; control may be done by changing the electrical or electromagnetic configuration of the antenna structure. In some embodiments, varactors are coupled to the MTM antenna structure to enable adjustment of the radiation pattern. In some embodiments, the MTM unit cells may be configured into subarrays that have specific characteristics. Each subarray may radiate a beamform, wherein control is applied to change or switch from one beam to another. Such control is provided by reactance means coupled to MTM unit cells. For use in an autonomous vehicle, the system may perform a coarse focus with a large beam width as an ambient condition, and then narrow the beam width when an echo is received, indicating an object is within the field of view of the antenna structure's radiation pattern. In this way, the larger beam width may sweep the full Field of View (FoV) of the antenna structure, reducing the time to scan the FoV. In some embodiments, the IAM is able to detect the area of the FoV of a detected object and map that to a specific configuration of MTM unit cells and/or subarrays to focus the beam, i.e. narrow the beam width. Additionally, in some embodiments, the specific dimensions and other properties of the detected object, such as traveling velocity with respect to the antenna structure, are analyzed and a next action(s) or course of action(s) is determined. The detected object in some embodiments is then provided as a visual or graphic display, which may act as a back-up security feature for the passenger in the vehicle.

Figure 18:
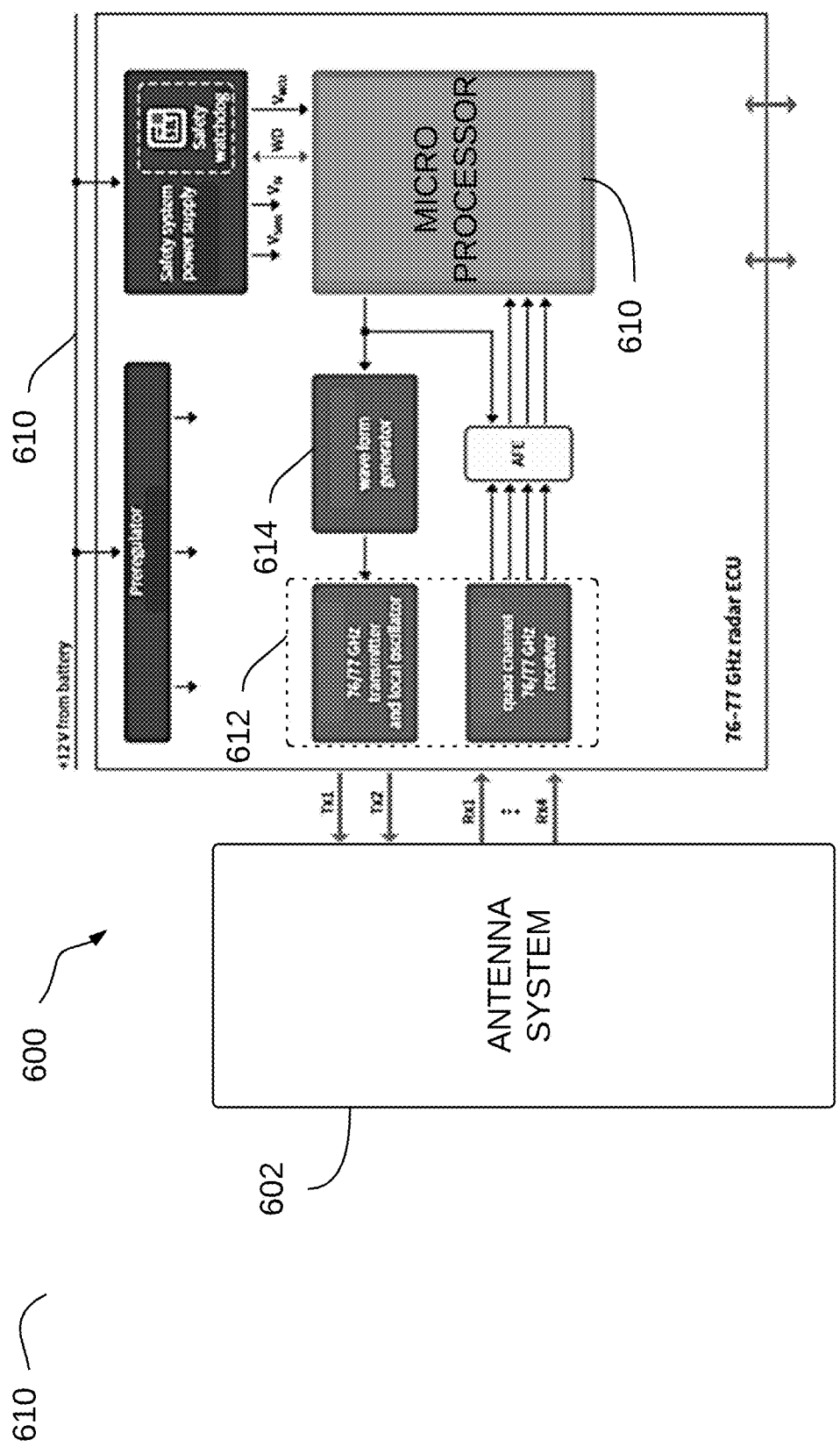
FIG. 18 illustrates an antenna system, according to embodiments of the present inventions.

FIG. 1 illustrates an MTM antenna system 100 including a MTM antenna array 110, or array 110 or radar array 110, controlled by module(s) 50. The array 110 is made up of a plurality of MTM unit cells as illustrated, but not limited to any particular format, and may be used for sensing functions, such as object detection, as well as for communication with wireless technologies and the Internet. In the present embodiment, the MTM antenna system 100 is a smart antenna system that able to steer an electromagnetic transmission beam in a variety of directions so as to detect objects within a given area or to facilitate communication in a specific direction with a specific user(s). The antenna steers the electromagnetic transmission beams by control of a plurality of MTM unit cells that form a radiating element, such as array 110 or a subset of array 110 known as a subarray. An example MTM unit cell 140 is illustrated, wherein the MRM unit cells are configured for transmission of the radiation beam and for receiving reflections, or echoes, of the radiation beam as it interacts with objects. The MTM antenna system 100 includes a control mechanism, antenna controller 52, to adjust the reactance behavior of the MTM unit cells and thereby steer and adjust the radiation or transmission beam of the transmitter and the receiver. Signals are processed through transmit/receive control 130, which may be implemented as a transceiver or as separate controls for transmit and receive. The transceiver may be provided as part of a control solution, such as radar sensor IC with ports assigned to transmit antenna(s) and to receive antenna(s). In some embodiments the radar IC includes optional power amplifiers (PAs) or these may be provided separately for the MTM antenna system 100. A radar IC example is illustrated in FIG. 18, having a separate transmitter and receiver, each coupled to antenna ports. The radar system 600 is discussed in more detail hereinbelow and serves as an example of the configurations that may interface with the antenna and feed structures of the present inventions.

The MTM antenna system 100 is controlled by controller 132, which is a microcontroller or microprocessor adapted for control of the MTM antenna system 100. The MTM antenna system 100 has capability to detect objects and activities within the surrounding area and complement other sensors within a vehicle or device, including a device located within the infrastructure of a community. The vehicle radar, or other sensor system, may be alerted to focus attention on a specific area and trigger advanced processing within a vehicle control system(s). While the present embodiment provides the ability to steer the beam, some embodiments incorporate fixed radar beams to scan the area at specific transmission angles.

The MTM antenna system 100 further includes an object detection module 114 and object analysis module 120, which may be look up tables or machine learning processing to identify objects once detected. The data used by the object detection module 114 and the object analysis module 120 may be stored in memory 54. This data may then be used to compare the received data to known objects and/or for perception in a neural network. These modules not only operate to detect an object within a field of view, but also to classify that object based on the known behavior of the array 110. These modules may also proactively to identify other objects in a field of view that may be related to the detected object or lack of a detected object. Alternate embodiments may not implement the object detection modules of the present examples.

The antenna controller 52 and the beam direction module 118 adjust the direction and beam parameters of electromagnetic waves from the array 110 through reactance control of the individual unit cell elements 140, the feed structure, or other portions of the MTM antenna array 100. This may involve identifying subarrays within the array 110 to achieve a desired beam formation or to generate multiple directed beams. Each of the unit cells 140 of array 110 is fed by a feed structure that couples input signals to the radiating elements of the array 110. There are a variety of feed structures that may be implemented, and the current embodiments illustrate several of these structures, but the present inventions are limited thereto.

The present inventions described herein provide for control of reactance, phase and signal strength in a transmission line, a power divider circuit, and so forth. The control circuit includes a reactance control module (RCM), or reactance controller, such as a variable capacitor, to change the reactance of a transmission circuit and thereby control the characteristics of the signal propagating through the transmission line. In some embodiments, the reactance controller is a varactor that changes the phase of a signal. In other embodiments, alternate control mechanisms are used.

For structures incorporating a dielectric substrate to form a transmission path, such as a substrate integrate waveguide (SIW), the reactance control structure may be integrated into the transmission line by inserting a microstrip or strip line portion that will support the reactance control modules. Where there is such an interruption in the transmission line, a transition is made to maintain signal flow in the same direction. Similarly, the reactance control structure may require a control signal, such as a DC bias line or other control means, to enable the system to control and adjust the reactance of the transmission line. To isolate the control signal from the transmission signal, embodiments of the present invention include a resonant controller that acts to isolate the control signal from the transmission signal. In the case of an antenna transmission structure, the resonant controller isolates the DC control signal from the AC transmission signal.

The present inventions are applicable in wireless communication and radar applications, and in particular in some metamaterial (MTM) structures capable of manipulating electromagnetic waves using engineered radiating structures. Additionally, the present inventions provide methods and apparatuses for generating wireless signals, such as radar signals, having improved directivity, reduced undesired radiation patterns aspects, such as side lobes. The present inventions provide antennas with unprecedented capability of generating radio frequency (RF) waves for radar systems. These inventions provide improved sensor capability and support autonomous driving by providing one of the sensors used for object detection.

The present inventions provide smart active antennas with unprecedented capability of manipulating radio frequency (RF) waves to scan an entire environment in a fraction of the time of current systems. The present invention provides smart beam steering and beam forming using MTM radiating structures in a variety of configurations, wherein electrical changes to the antenna are used to achieve phase shifting and adjustment reducing the complexity and processing time and enabling fast scans of up to approximately 360° field of view for long range object detection.

The present invention supports a feed structure having a plurality of transmission lines configured with discontinuities within the conductive material and having a lattice structure of unit cell radiating elements proximate the transmission lines. The feed structure includes a coupling module for providing an input signal to the transmission lines, or a portion of the transmission lines. The present embodiments illustrate the flexibility and robust design of the present invention in antenna and radar design. In some embodiments, the coupling module is a power divider structure that divides the signal among the plurality of transmission lines, wherein the power may be distributed equally among the N transmission lines or may be distributed according to another scheme, wherein the N transmission lines do not all receive a same signal strength.

The feed structure may include impedance matching elements coupled to the transmission array structure. In some embodiments, the impedance matching element incorporates a reactance control element to modify a capacitance of the radiating array structure. The impedance matching element may be configured to match the input signal parameters with radiating elements, and therefore, there are a variety of configurations and locations for this element, which may include a plurality of components.

In an example embodiment, the impedance matching element includes a directional coupler having an input port to each of adjacent transmission lines. The adjacent transmission lines and the impedance matching element form a super element, wherein the adjacent transmission line pair has a specific phase difference, such as a 90-degree phase difference with respect to each other.

As described in the present invention, a reactance control mechanism is incorporated to adjust the effective reactance of a transmission line and/or a radiating element fed by a transmission line. Such a reactance control mechanism may be a varactor diode having a bias voltage applied by a controller. The varactor diode acts as a variable capacitor when a reverse bias voltage is applied. As used herein, the reverse bias voltage is also referred to herein as reactance control voltage or varactor voltage. The value of the reactance, which in this case is capacitance, is a function of the reverse bias voltage value. By changing the reactance control voltage, the capacitance of the varactor diode is changed over a given range of values. Alternate embodiments may use alternate methods for changing the reactance, which maybe electrically or mechanically controlled. In some embodiments of the present invention, a varactor diode may also be placed between conductive areas of a radiating element. With respect to the radiating element, changes in varactor voltage produce changes in the effective capacitance of the radiating element. The change in effective capacitance changes the behavior of the radiating element and in this way the varactor may be considered as a tuning element for the radiating elements in beam formation.

The reactance control mechanism enables control of the reactance of a fixed geometric transmission line. One or more reactance control mechanisms may be placed within a transmission line. Similarly, reactance control mechanisms maybe placed within multiple transmission lines to achieve a desired result. The reactance control mechanisms may have individual controls or may have a common control. In some embodiments, a modification to a first reactance control mechanism is a function of a modification to a second reactance control mechanism.

These inventions support autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. The sensor performance is also enhanced with these structures, enabling long-range and short-range visibility to the controller. In an automotive application, short-range is considered within 30 meters of a vehicle, such as to detect a person in a cross walk directly in front of the vehicle; and long-range is considered to 250 meters or more, such as to detect approaching cars on a highway. These inventions provide automotive radars capable of reconstructing the world around them and are effectively a radar "digital eye," having true 3D vision and capable of human-like interpretation of the world.

In some embodiments, a radar system steers a highly-directive RF beam that can accurately determine the location and speed of road objects. These inventions are not prohibited by weather conditions or clutter in an environment. These inventions provide performance similar to that available with synthetic aperture radar (SAR) capability. The present inventions use radar to provide information for 2D image capability as they measure range and azimuth angle, providing distance to an object and azimuth angle identifying a projected location on a horizontal plane, respectively, without the use of traditional large antenna elements.

The present invention provides methods and apparatuses for radiating structures, such as for radar and cellular antennas, and provide enhanced phase shifting of the transmitted signal to achieve enhanced transmission in the autonomous vehicle range, which in the US is approximately 77 GHz and has a 5 GHz range, specifically, 76 GHz to 81 GHz, reduce the computational complexity of the system, and increase the transmission speed. The present invention accomplishes these goals by taking advantage of the properties of hexagonal structures coupled with novel feed structures. In some embodiments, the present invention accomplishes these goals by taking advantage of the properties of metamaterial (MTM) structures coupled with novel feed structures.

Metamaterials derive their unusual properties from structure rather than composition and they possess exotic properties not usually found in nature. The metamaterial antennas may take any of a variety of forms, some of which are described herein for comprehension; however, this is not an exhaustive compilation of the possible embodiments of the present invention.

Figure 2:
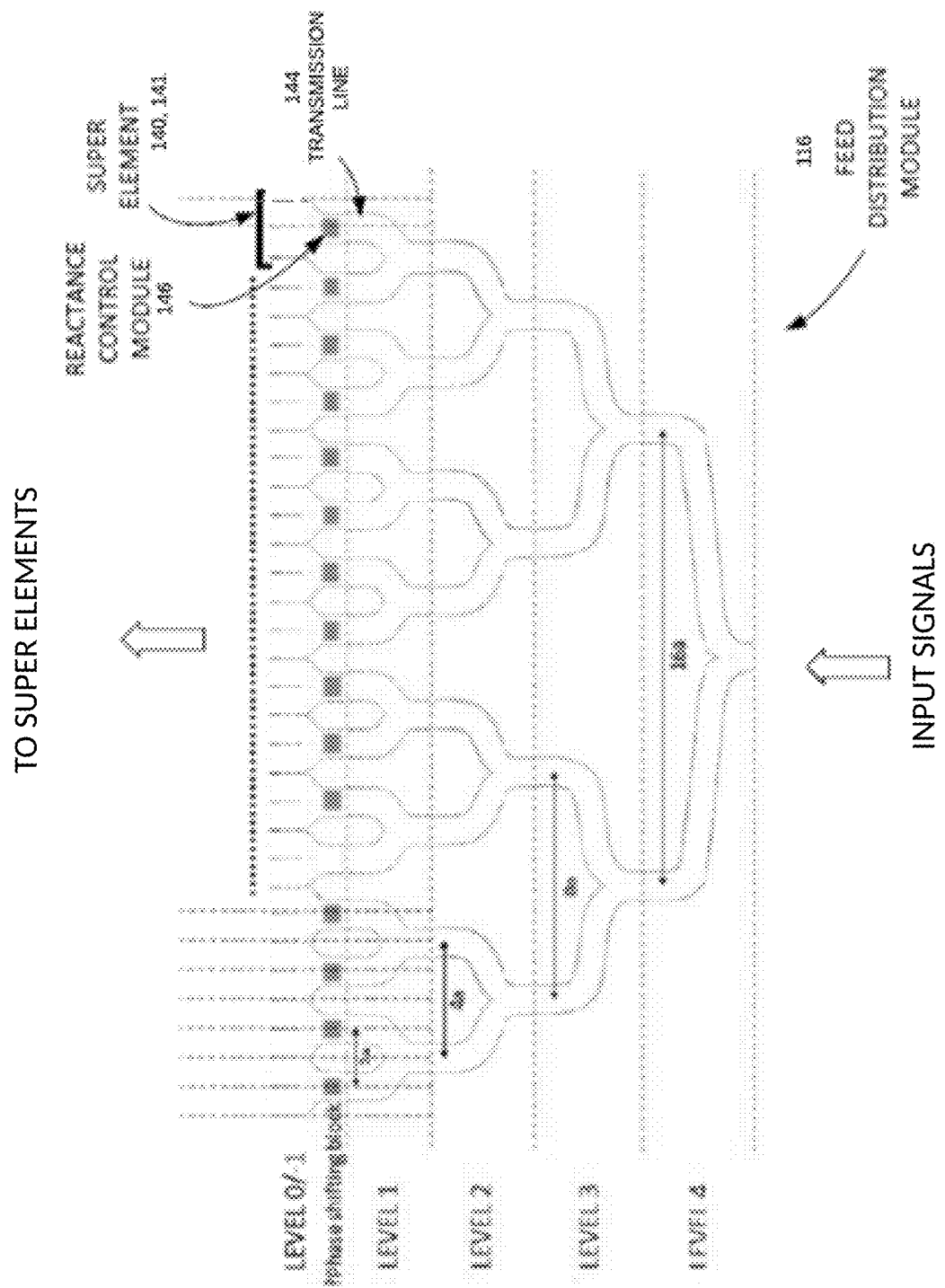
FIG. 2 illustrates a feed structure for an antenna system, according to embodiments of the present invention.
Figure 5:
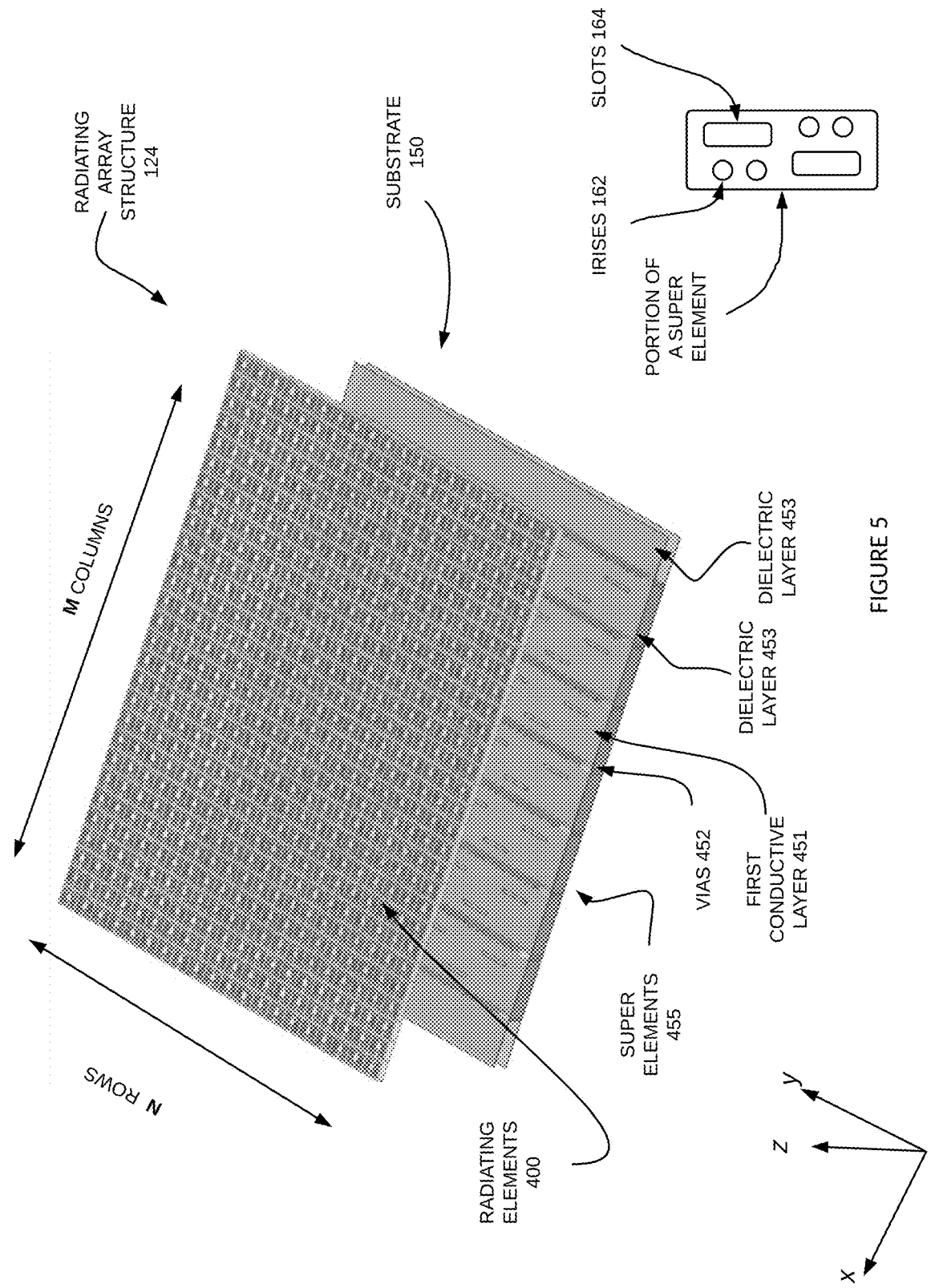
FIG. 5 illustrates a metamaterial antenna system, according to embodiments of the present invention.

FIG. 2 illustrates a perspective view of one embodiment of a corporate feed structure, feed distribution module 116, for an antenna system 100 as in FIG. 1, wherein the feed distribution module 116 includes a plurality of transmission lines structured through a power divider. The feed distribution module 116 extends and couples to MTM antenna array 110. The radiating array 110 of this embodiment is configured as a lattice of unit cells or radiating elements, such as MTM unit cell element 140 of FIG. 1. The unit cells are metamaterial artificial engineered conductive structures that act to radiate electromagnetic waves as transmission signals and/or receive the transmitted signals. The lattice structure of array 110 is positioned proximate a layer of transmission lines, referred to herein as super elements. The super elements are illustrated in FIG. 5 and described in more detail hereinbelow. The array 110 is positioned proximate the super elements such that the signal fed into the super elements is received at the array 110. The feed distribution module 116 is effectively a power divider circuit that is configured to receive an input signal and propagate that signal through the various paths leading to the super elements. The feed distribution module 116 has a plurality of division points belonging to different levels. The input signal is divided in level 4, and then each of those paths are divided again in level 3, and so forth through level 0 where the transmission paths are divided again to couple to super elements. The size and dimensions of the transmission paths of feed distribution module 116 may be sized to achieve a desired goal, such as for even power distribution or tapering of edges and so forth. The configuration of FIG. 2 is an example and is not meant to limit the inventions to this specific configuration. The size of each path may be configured to achieve a desired transmission and/or radiation result. In the present example, transmission path 144 is in level 1 and includes a reactance control mechanism 146 to change the reactance of the transmission path, also referred to as a transmission line. The change in reactance changes parameters of the signal propagating through the transmission path 144.

The reactance control module 146 may be implemented at other positions within the feed distribution module 116. Changes in the reactance through reactance control module 146 may be used to control the phase of a radiating signal in the azimuth direction. Transmission line 144 is coupled to super elements 140 and 141, which are transmission lines positioned proximate the array 110. The reactance control module 146 is configured in a microstrip within transmission line 144 according to an example embodiment. The placement of the reactance control module 146 may be at division points between divided paths or may be positioned at multiple locations and multiple levels of the feed distribution module 116. Similarly, the reactance control modules 146 may be positioned within a super element and/or within array 110.

The transmission paths of feed distribution module 116 are formed in a substrate and may be defined by vias coupling conductive layers of the substrate, wherein the signal propagates through the transmission paths which act as a substrate integrated waveguides (SIWs). Alternate embodiments may provide different propagation methods and structures for a corporate feed.

In operation, MTM antenna system 100 scans the area of the field of view with transmission beams, which detect cars, people, lamps and so forth. The variety of objects and devices within this environment may change quickly, and so in operation as a radar, the MTM antenna system 100 acts as a complement to other object detection devices within the vehicles. The reactance control module 146 is a component that enables this fast beam control to enable responsive operation. There are also reactance control mechanisms used in coordination with the array 110 to enable a large angular range to accommodate operation as a radar sensor or for tracking users in a wireless network.

In a radar system, once an object is detected, the MTM antenna system 100 determines a portion of the antenna array to allocate to a scan for that object. The array 110 then effectively acts as multiple antennas, each having a controllable radiation beam. This allocation of the unit cell elements 140 may be based on the size of the object, the reflectivity or return signal strength of the object, the location of the object, the velocity of the object and other parameters. In some embodiments, the system determines a high probability that a pedestrian is in the path of a vehicle and controls the antenna array 110 to focus on that location as the ramifications of a mistake is greater than for another vehicle.

For scans of moving objects, the MTM antenna system 100 may use received radar information to determine a next location of the object and adjust the scan accordingly. As illustrated, a series of scans may be allocated for a vehicle in motion to track the location and activity of the object.

Figure 15:
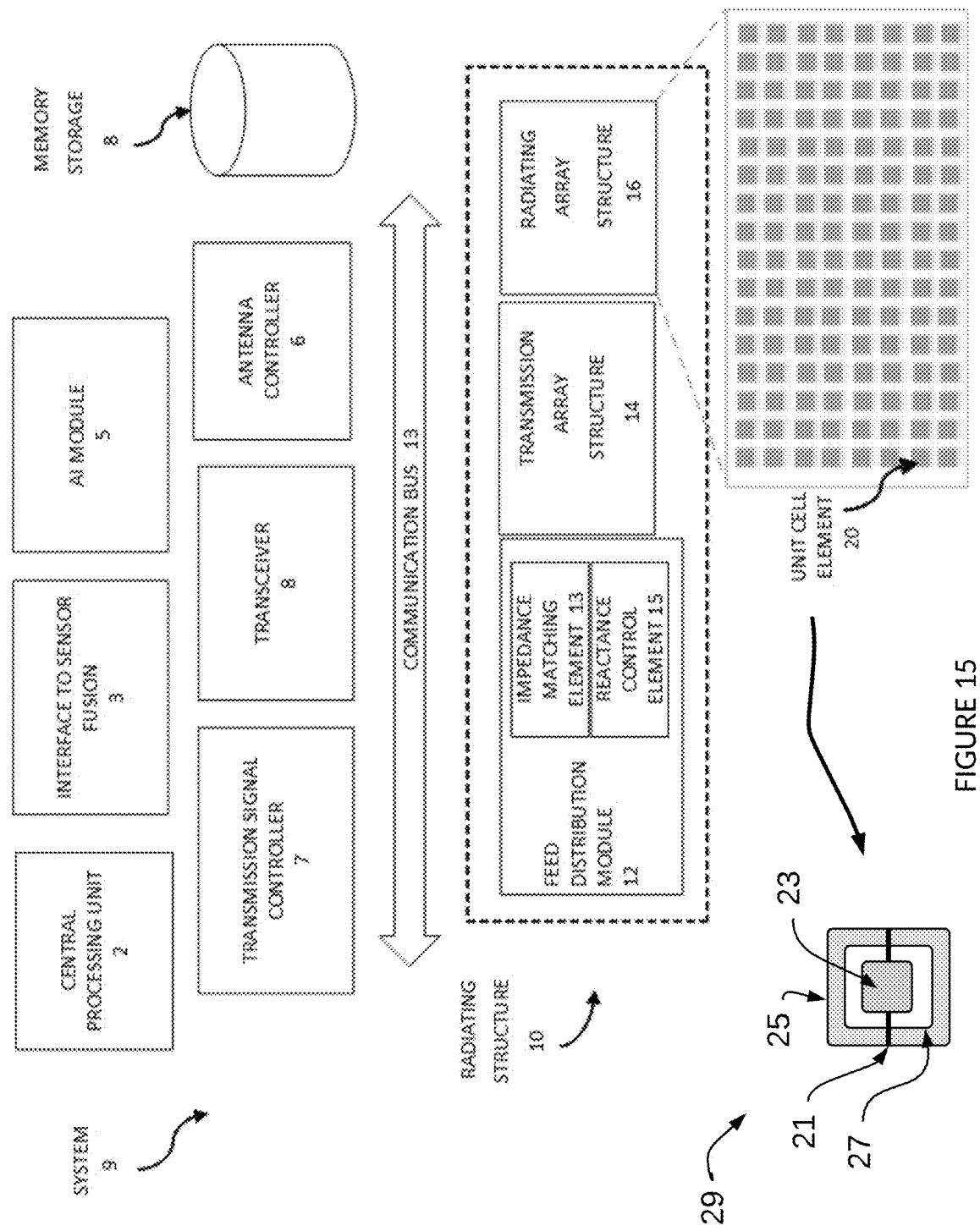
FIG. 15 illustrates a system having a feed distribution network for a radar sensing system, according to embodiments of the present invention.
Figure 3:
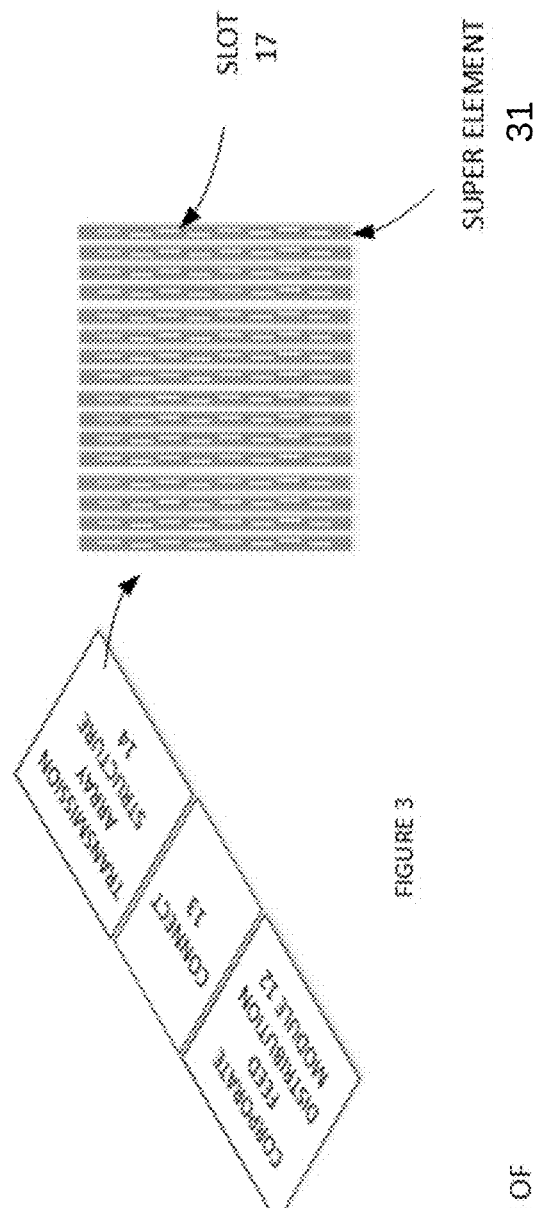

The MTM antenna system 100 may be include wireless communication capability to communicate with other devices and vehicles. The MTM antenna system 100 may act in concert with a fixed wireless system, wherein communications are processed from MTM antenna system 100 through the fixed wireless system. Object classification information may also be used to modify behavior of the MTM antenna system 100, such as to provide non-line of sight signals when there is a large truck or other obstacle to wireless transmission. When such an object is detected, the MTM antenna system 100 may check for a fixed wireless system having capability to initiate actions so that MTM antenna system 100 may avoid a dead spot, such as to use a reflect array or other method to continue coverage. Each of the subarrays is controlled by control of individual unit cells. In the present embodiments, the MTM antenna array 110 has a plurality of MTM unit cells 140 each having at least one reactance control mechanism, such as a varactor or varactors, which are controlled by an antenna controller 52. A unit cell is illustrated in FIG. 15 having multiple varactors coupled between a conductive patch and a conductive loop. The radar and communication operation may be performed by the same MTM antenna structure 170, wherein subarrays are formed for operation. The subarrays may be reconfigured in real time.

The MTM antenna system 100 may have multiple antenna arrays, similar to MTM antenna array 110. These arrays may be divided into transmit and receive or may be duplex-style where an array is used for both transmit and receive. The signals are generated according to the transceiver operation. For operation of the antenna, including beam forming and beam steering, a rule base and decision engine may be implemented to provide guidance on when and where to direct the radiation beams based on behavior of the MTM antenna system 100. The object detection module 114 uses received information to determine if an object is in the area, or field of view, of the radar. The object detection module 114 may also use information from a wireless communication system to identify objects that are causing a dead zone, such as a parked truck, or to respond to information, such as from a central controller or from a vehicle. The MTM antenna system 100 may support vehicle-to-device, or V2X, communications to enhance the radar operations. In this way, the vehicle can probe the MTM antenna system 100 for additional information to better understand the environment and the activity therein.

The MTM antenna array 110 includes multiple MTM unit cells, wherein each MTM unit cell 140 is an artificially structured element used to control and manipulate physical phenomena, such as electromagnetic (EM) properties of a signal including the amplitude, phase, and wavelength. Metamaterial structures behave as derived from inherent properties of their constituent materials, as well as from the geometrical arrangement of these materials with size and spacing that are much smaller relative to the scale of spatial variation of typical applications. Individual MTM components are considered as unit cells, e.g., MTM unit cell 140. A metamaterial is not a tangible new material, but rather is a geometric design of known materials, such as conductors, that behave in a specific way.

An MTM unit cell, such as cell 140, may be composed of multiple microstrips, gaps, patches, vias, and so forth having a behavior that is the equivalent to a reactance element, such as a combination of series capacitors and shunt inductors. Various configurations, shapes, designs and dimensions are used to implement specific designs and meet specific constraints. In some embodiments, the number of dimensional freedom determines the characteristics, wherein a device having a number of edges and discontinuities may model a specific-type of electrical circuit and behave in a similar manner. In this way, the MTM unit cell radiates according to the configuration and changes to the reactance parameters of the MTM unit cell change the radiation pattern. Where the radiation pattern is changed to achieve a phase change or phase shift, the resultant structure is a powerful antenna or radar, as small changes to the MTM unit cell result in large changes to the beamform.

The MTM antenna array 110 may be configured as an array of MTM unit cells, a lattice pattern of MTM unit cells, and so forth. These array formations may then be divided into subarrays, which group unit cells together. The subarray may be controlled by a common controller.

The antenna modules 50 acts to control the operational parameters of the MTM antenna arrray 110. In some embodiments, these parameters include voltages applied to individual MTM unit cells, such as unit cell 140, wherein modules and components that capture, measure, store, analyze and provide instructions manipulate the parameters of the individual MTM unit cells to adjust transmission beams. The antenna modules include software programmable modules implemented in hardware.

In the present embodiment described herein, the application is for an autonomous car, wherein the MTM antenna system 100 is a sensing system that uses radar to identify objects. The use of radar provides a reliable way to detect objects in difficult weather conditions. For example, historically a driver will slow down dramatically in thick fog, as the driving speed decreases with decreases in visibility. On a highway in Europe, for example, where the speed limit is 115 km/h, a driver may need to slow down to 40 km/h when visibility is poor. Using the present embodiment, the driver (or driverless car) may maintain the maximum safe speed without regard to the weather conditions. Even if other drivers slow down, the car enabled with the present embodiment will be able to detect those slow-moving cars and obstacles in the way and avoid/navigate around them.

Additionally, in highly congested areas, it is necessary for an autonomous car to detect objects in sufficient time to react and take action. The present invention increases the sweep time of a radar signal so as to detect any echoes in time to react. Supplemental to the MTM antenna array 110 is the nodal radar system, such as MTM antenna system 100 of FIG. 1, wherein information captured from another point within the environment assists in the ability of the vehicle's radar to perform and make decisions. In rural areas and other areas with few obstacles during travel, the module 50 may also be referred to as a smart controller, or an intelligent antenna of metamaterial (IAM), wherein the module 50 has capability to adjust the focus of the beam to a larger beam width, thereby enabling a faster scan of areas where there are few echoes. A module 50 may detect this situation by evaluating the number of echoes received within a given time period and making beam size adjustments accordingly. Once an object is detected, the module 50 determines how to adjust the beam focus. This is achieved by changing the specific configurations and conditions of the MTM antenna array 110. For example, in one scenario the voltages on the varactors are adjusted. In another scenario, a subset of unit cells is configured as a subarray. This configuration means that this set may be treated as a single unit, and all the varactors are adjusted similarly. In another scenario, the subarray is changed to include a different number of unit cells, where the combination of unit cells in a subarray may be changed dynamically to adjust to conditions and operation of the system.

All of these detection scenarios, analysis and reactions may be stored in the module 50 and used for later analysis or simplified reactions. For example, if there is an increase in the echoes received at a given time of day or on a specific highway, that information is fed into the IAM controller 52 to assist in proactive preparation and configuration of the MTM antenna array 110. Additionally, there may be some subarray combinations that perform better, such as to achieve a desired result, and this is stored in the IAM memory 54.

In operation, the MTM antenna array 110 provides radar radiation pattern(s) to scan the FoV of the MTM antenna system 100. In some embodiments, an FoV composite data unit 112 stores information that describes the FoV. This may be historical data used to track trends and anticipate behaviors and traffic conditions or may be instantaneous or real time data that describes the FoV at a moment in time or over a window in time. The ability to store this data enables the module 50 to make decisions that are strategically targeted at a particular point or area within the FoV. For example, the FoV may be clear (no echoes received) for five minutes, and then one echo arrives from a specific region in the FoV; this is similar to detecting the front of a car. In response, the module 50 may determine to narrow the beam width for a more focused view of that sector or area in the FoV. The next scan may indicate the objects' length or other dimension, and if the object is a car, the module 50 may consider what direction the object is moving and focus the beams on that area. Similarly, the echo may be from a spurious object, such as a bird, which is small and moving quickly out of the path of the car. There are a variety of other uses for the FoV composite data 112, including the ability to identify a specific type of object based on previous detection.

The object detection module 114 receives control information from the IAM controller 52, and determines the adjustments, if any, to be made. In some embodiments, the scan begins with a coarse scan having a large bandwidth. On object detection, the beam width narrows. The variable beam dimension module 116 responds to the object detection module 114 and may vary the beam width as quickly or slowly as desired. In some embodiments, the beam width is a binary value, and in others it may take on continuous values. The object detection module 114 instructs the beam direction module 118 where to direct the beam, such as from a subarray. From the received information (echoes) the object dimension analysis module 120 determines parameters and dimensions of the detected object.

Object detection may be enhanced with object classification to identify the type of object and its activity parameters. For example, a deep learning system may be incorporated to identify a person from a car, and to identify the velocity of that object. Such systems train on labelled data and actual radar signals after which they are able to perceive objects with a high probability of certainty. Such object classification systems and capability may be additional to the rule base and decision engine 60.

Continuing with MTM antenna system 100, the transmit/receive control 130 is controlled by controller 132 and controls the transmit and receive paths to and from MTM antenna array 110. There may be a portion of the unit cells, such as unit cell 140, that is dedicated to receive, and another portion that is dedicated to transmit, or the MTM antenna array 110 may be a transmit and receive antenna. In some embodiments, the module 50 may allocate specific unit cells, or subarrays, as receive only, transmit only or as transmit and receive. There are any number of combinations and designs for these embodiments.

Figure 7:
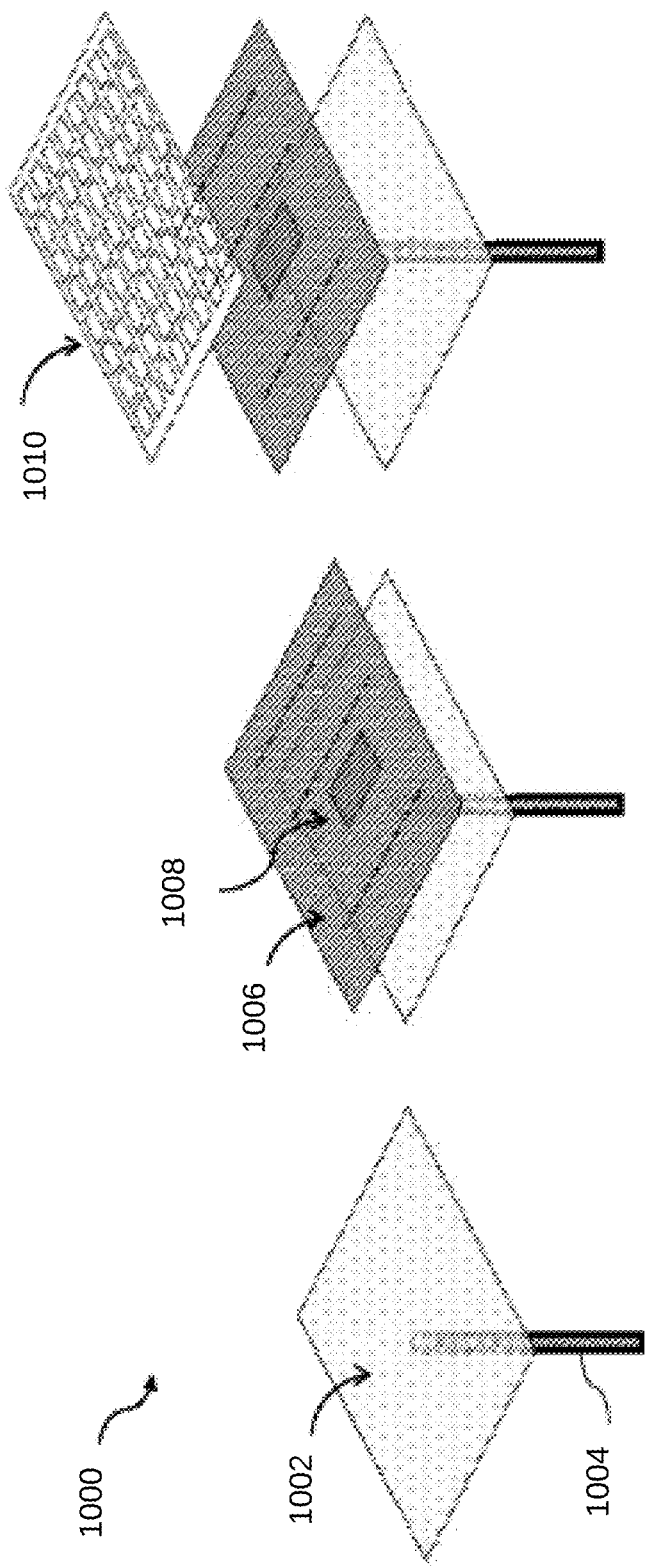

There are many methods that systems that the MTM antenna array 110 may use with respect to the module 50 for applying, embedding, controlling and so forth. An embodiment for dynamic control of the MTM antenna array 110 is illustrated in FIG. 7.

As discussed hereinabove, FIG. 2 illustrates a corporate feed structure as a feed distribution module 116 that feeds signals to radiating elements of the MTM antenna system 100. The feed distribution module 116 includes a plurality of paths for power division of an input signal. There are several levels associated with the divisions such that each level has a different number of transmission paths. The transmission paths result in paths of super elements, such as super elements 140, 141, which are each a length of transmission line or wave guide that has a plurality of slots or discontinuities in a metal layer such that the signal propagating through the transmission line will radiate onto the array 110 of MTM elements. Within the feed distribution module and/or super elements, is positioned a reactance control module to change a reactance behavior of the super element. In the illustrated example, a reactance control module 146 is positioned within transmission lines in level 0. The transmission array structure 122 corresponds to radiating array 110 of FIG. 1.

Figure 3:
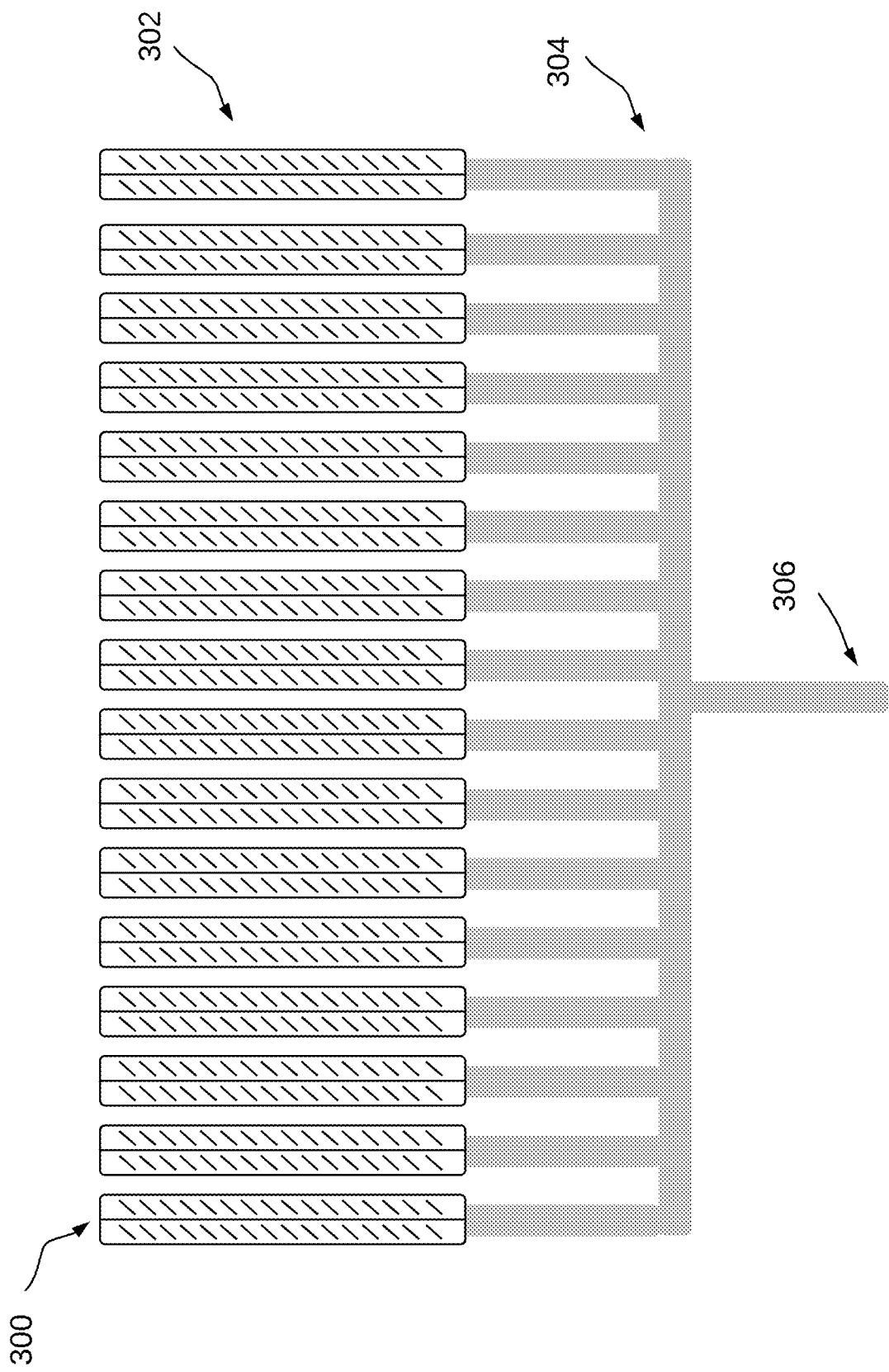
FIGS. 3 and 4 illustrate perspectives of a feed structure for antenna systems, according to embodiments of the present invention.

There are a variety of feed networks that may be implemented to feed the radiating array 110. FIG. 3 illustrates a feed structure 300 having an input path 306 coupled to a plurality of individual transmission paths 304 leading to super elements 302. In this embodiment, the power is divided equally among the various paths 304 but may be divided differently by resizing and shaping the various transmission paths 304. The number of paths 304 is determined by the size of the system and the coupling to super elements 302. The transmission paths 304 may be formed in a substrate of dielectric material positioned between conductive layers, wherein paths are defined in the dielectric for propagation of signals. The transmission paths 304 may be sized to provide a tapering of the radiated signal. As illustrated, the super elements extend in the y-direction and the transmission paths 304 are spread across the x-direction; signals propagate through the feed structure 300 from the input path or port 306 through paths 304 and super elements 302; and the signals radiate from the super elements 302 to the array 110 (FIG. 1) and are directed approximately orthogonally to the x-y plane.

Figure 4:
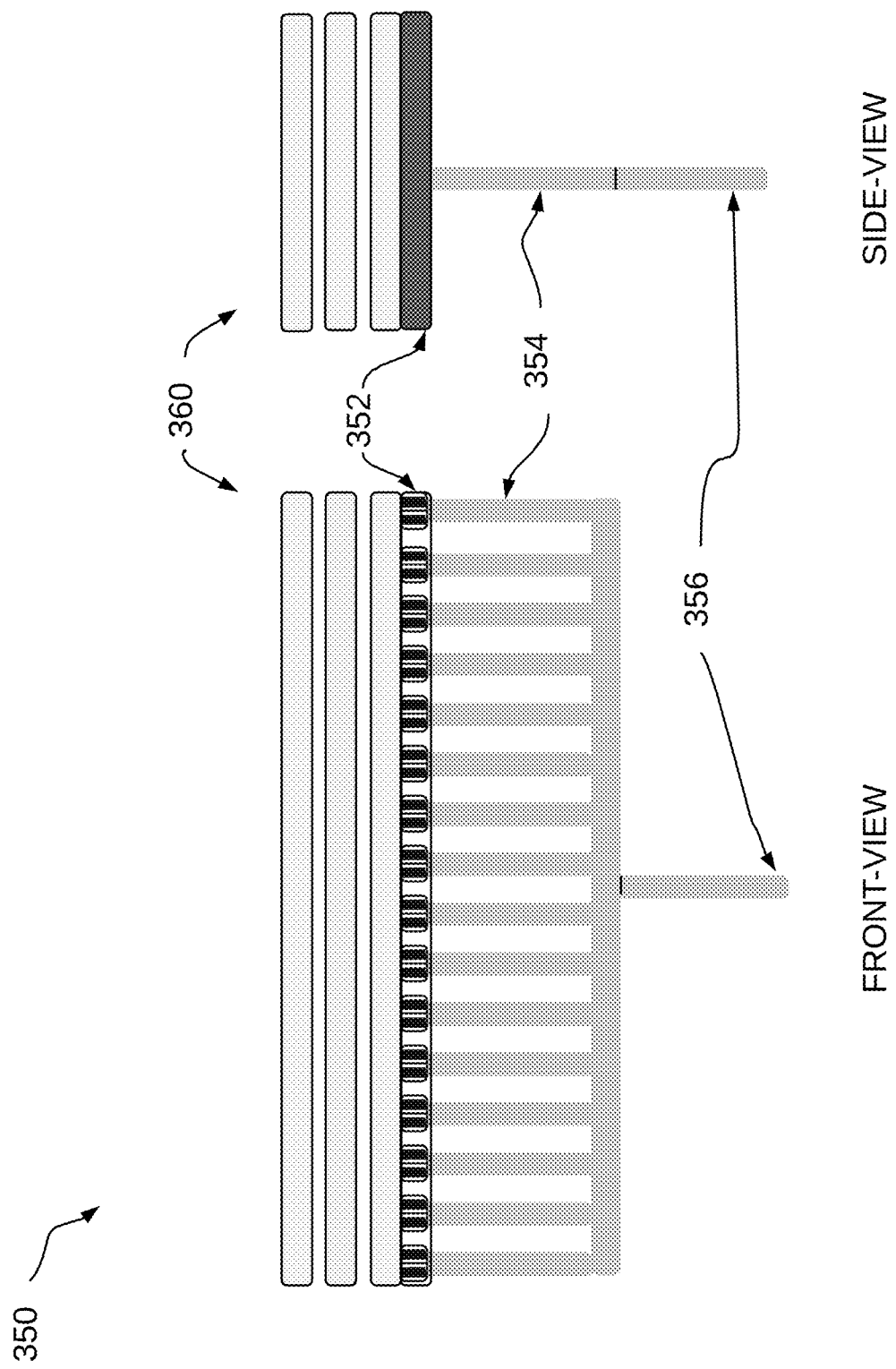

FIG. 4 illustrates a perspective view of the feed structure 350 similar to structure 300 of FIG. 3 but having the feed structure 350 in a different plane than that of the super elements. In this embodiment, the feed structure elements, input 356 and paths 354 are positioned approximately orthogonal to the plane of the super elements 352. The super elements 352 are positioned in the x-y plane, while the feed structure elements 356, 354 are positioned in the z-direction. In this perspective, the edges of the super elements 352 are positioned atop the ends of paths 304. The super elements 302 are coupled to various layers 360, including a frequency selective layer or an MTM layer. There may be multiple MTM layers configured as illustrated and having gaps positioned between adjacent layers. The gap may be filled with air or dielectric. There may be any number of layers. In some embodiments, each layer has a specific frequency-selective behavior that passes certain frequencies and reflects other frequencies. Some embodiments incorporate a single MTM layer proximate the super elements. Additional MTM layers may be incorporated to extend the angular range over which the radiation signal may be controlled. The MTM layer 360 may incorporate a similar lattice structure or may incorporate different patterns and structures. In some embodiments all of the MTM unit cell elements of MTM layers 360 have at least one reactance control mechanism, such as a varactor, and in other embodiments only a subset of the MTM unit cell elements have such control.

FIG. 5 is a perspective of the radiating array 110 illustrating the various layers forming the device. The substrate 150 includes a first conductive layer 451, a dielectric layer(s) 453, and a super element layer 455. The super elements are formed by conductive and non-conductive traces on a top portion of the super element layer 455 and by vias 452 formed through the super element layer 455 and through the dielectric layer(s) 453. The vias are lined with conductive material, or may be filled with conductive material, so as to form channels defining the super elements 452 and providing a wave guide function to maintain propagation of the signals fed into the super elements 452. The longitudinal direction of the super elements 452 in the perspective of FIG. 5 is in the y-direction or elevation. The signal radiates in the z-direction and the horizontal direction of this configuration is the x-direction. Again, note these directions are for explaining the invention and do not necessarily correlate to absolute horizontal of vertical references.

A portion of a super element is illustrated having irises 162 built into the structure. The irises 162 are a set of vias positioned near a slot 164. The irises 162 are made of a conductive material that may fill or line the via from one conductive layer to another conductive layer through dielectric layer(s). The irises 162 are designed to adjust a direction of a radiation signal from the radiating array structure 124 and act as a default directivity of signals. From the default angle, reactance control of the radiating elements 400 achieves an expanded angular range. For example, by fixing a first default directivity of a first subset of the radiating elements 400 and a second default directivity of a second subset of the radiating elements 400 it is possible to double the range of angles through which the beam may be directed. In this way, there is an enhanced and expanded range of sensing for a radar device and tracking for a communication device.

Figure 6:
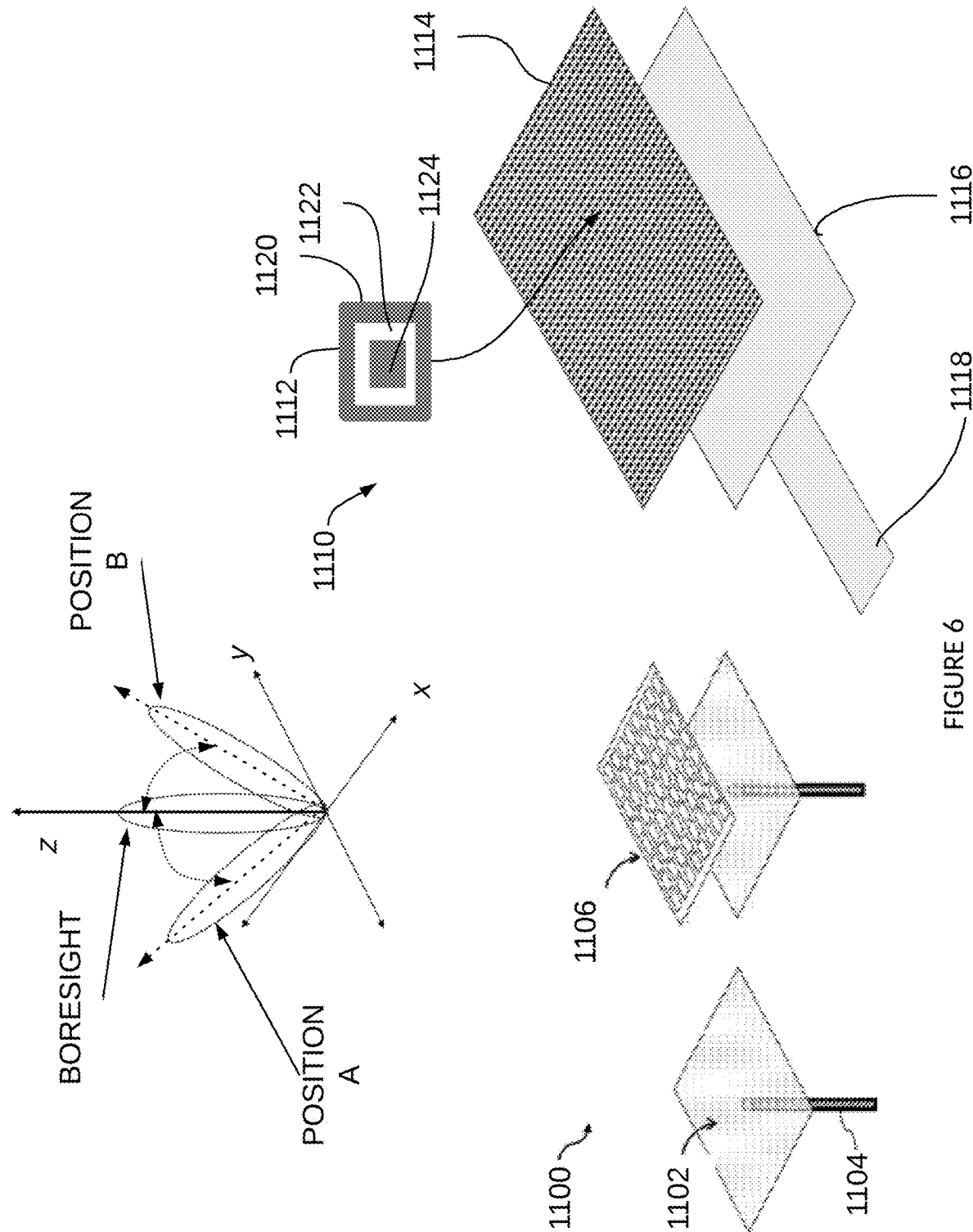
FIGS. 6 and 7 illustrate metamaterial antennas, according to embodiments of the present invention.

Another feed structure embodiment is illustrated in FIG. 6, which is a two-layer, probe fed MTM antenna structure 1100. A probe 1104 supplies the signal to a ground plane layer 1102. In this embodiment, an MTM antenna structure 1106 is placed over the ground plane proximate the MTM antenna structure 1106. The source signal is distributed across the ground plane 1102 such that a relatively flat wave form is presented to the MTM antenna structure 1106. The MTM antenna structure 1106 then radiates the transmission signal as described herein, wherein each unit cell may transmit individually or transmit as a sub-array. In this way, even though a same signal is provided to each element of structure 1106 there may be multiple beams transmitted and they may be phase shifted to achieve radar scan or communication tracking. The signal radiates in the z-direction (see inset), wherein boresight radiation beams have maximum directivity on the z-axis as defined in this example. Control of the reactance of an MTM cell steers the beam to an angle, such as position A and position B. As illustrated, the antenna structure 1100 may be configured to enable steering of the radiated beam in the x-direction and/or the y-direction.

The antenna structure 1100 includes a plurality of MTM unit cells in MTM antenna structure 1106, which is a layer positioned above the ground plane 1102. In some embodiments, an antenna structure 1110 incorporates radiating structure 1112 which may be MTM designed or frequency-specific structures that respond to changes in electrical parameters of the radiating structure 1112 and change the phase of the radiated signal. There are any number of structures and configurations for layer 1114 which is positioned proximate a ground plane or feed layer 1116. In the present embodiment, the feed layer 1116 is a solid conductive layer, however, in alternate embodiments a variety of feed structures may be configured within feed layer 1116, including super elements as described in FIG. 5. The feed layer 1116 is coupled to a connector 1118 which provides an input signal to the feed layer 1116 from which it radiates to the layer 1114 from which the signal radiates over the air. In this way, the signal may be considered to reradiate from the layer 1114. The various structure 112 may take any of a variety of shapes, forms and configurations. As illustrated, the structure 1112 has an outer conductive area or loop 1120, an inner conductive patch 1122 and a gap 1124 around the perimeter of the patch 1122. Alternate embodiments may use multiple concentric structures of conductive and dielectric portions and may take any of a number of shapes. In some embodiments the dimensions of the conductive portions of the structures of layer 1114 are designed to have a specific number of edges so as to achieve a desired result in the electromagnetic behavior of the structure. These may be positioned together in a lattice or may be positioned in an asymmetric pattern.

Returning to FIG. 1, the MTM antenna system 100 illustrates a radar system for object detection in a vehicular system and may be used for both autonomous functions and driver assist functions. The radiating array structure 100 is coupled to antenna controller 52 for c control of the individual components of the antenna, wherein antenna controller 52 may control each individual unit cell or may control a set of the unit cells together. The controller 132 controls operation of the system 100 including operation of the transmit/receive control 130 so as to generate modulated transmission signals. In vehicle applications, the system 100 may use frequency modulated continuous wave (FMCW), which is used as for radar sensor applications as the transmitted signal is modulated in frequency, or phase. FMCW radar transmits a linear frequency-modulated continuous wave as a chirp sequence, wherein the frequency versus time characteristic may be a sawtooth pattern, a triangular pattern or other pattern defined by transitions, such as a transition from increasing to decreasing. A chirp refers to the periodic sequence of transitions. For a sawtooth wave, there is one chirp where the frequency increases linearly with time until it reaches a maximum frequency and then drops to its starting frequency and repeats. The FMCW signal is transmitted, reflects off an object and is received at the radar sensor as a delayed and attenuated copy of the transmit signal. From the differences in the transmit and receive signals information corresponding to the detected objects is obtained. At a given time, the difference between the frequency of the transmit signal and the receive signal provides the range, or distance, to a detected object (target). This information is obtained by taking a fast Fourier transform (FFT) of the received signal and identifying a peak(s) corresponding to an object(s). The receive frequency is referred to as the beat-frequency and there will be a beat-frequency corresponding to each detected object. The beat-frequency signal has a Doppler component that is a function of the relative velocity between the radar sensor and the target. The Doppler component is found by performing a second FFT across chips and evaluating the phase shift of the beat signal from one chirp to the next. The FMCW signal enables radar to measure range to an object by measuring the phase differences in phase or frequency between the transmitted signal and the received signals or reflected signal. An additional advantage of FMCW is the ability to capture velocity and acceleration of a detected object.

Other modulation types may be incorporated according to the desired information and specifications of a system and application. Within FMCW formats, there are a variety of modulation patterns that maybe used within FMCW, including triangular, sawtooth, rectangular and so forth, each having advantages and purposes. For example, sawtooth modulation may be used for large distances to a target; a triangular modulation enables use of the Doppler frequency, and so forth. The received information is stored in a memory storage unit 54, wherein the information structure may be determined by the type transmission and modulation pattern.

The transmission signal controller 132 may generate a cellular modulated signal, such as orthogonal frequency division multiple (OFDM) signal. The transmission feed structure may be used in a variety of systems. In some systems, the signal is provided to the MTM antenna system 100 and the transmission signal controller 132 may act as an interface, translator or modulation controller, or otherwise as required for the signal to propagate through a transmission line system.

The present invention is described with respect to a radar system, where the radiating structure 110 is a transmission array-fed radiating array, where the signal radiates through slots in the transmission array to the radiating array of MTM elements that radiate a directional signal. The radiating structure 110 includes individual elements and may include impedance matching elements and reactance control elements.

In some embodiments a reactance control element includes a capacitance control mechanism controlled by antenna controller 52, which may be used to control the phase of a radiating signal from radiating array structures, transmission array structure for elevation directions and transmission array structure for azimuth directions. In operation, the antenna controller 52 receives information from other modules in MTM antenna system 100 indicating a next radiation beam, wherein a radiation beam may be specified by parameters such as beam width, transmit angle, transmit direction and so forth. The antenna controller 52 determines a voltage matrix to apply to the reactance control mechanisms coupled to the radiating structure to achieve a given phase shift or other parameters. In these embodiments, the radiating array structure 110 is adapted to transmit a directional beam without using digital beam forming methods, but rather through active control of the reactance parameters of the individual elements that make up the array. Transceiver 130 prepares a signal for transmission, such as a signal for a radar device, wherein the signal is defined by modulation and frequency. The signal is received by each element of the radiating array structure 110 and the phase of the radiating array structure 110 is adjusted by the antenna controller 52. In some embodiments, transmission signals are received by a portion, or subarray, of the radiating array structure 15. These radiating array structures 110 are applicable to many applications, including radar and cellular antennas. The present embodiments consider application in autonomous vehicles as a sensor to detect objects in the environment of the car. Alternate embodiments may use the present inventions for wireless communications, medical equipment, sensing, monitoring, and so forth. Each application type incorporates designs and configurations of the elements, structures and modules described herein to accommodate their needs and goals.

In MTM antenna system 100, a signal is specified by antenna controller 52, which may be in response to an Artificial Intelligence (AI) engine (not shown) from previous signals or may be from the interface to sensor fusion or other computation unit; or may be based on program information from memory storage 54. There are a variety of considerations to determine the beam formation, wherein this information is provided to antenna controller 52 to configure the various elements of arrays in radiating array structure 110. The transmission signal controller 132 generates the transmission signal and provides same to feed distribution module 116, which provides the signal to transmission lines arranged as super elements.

In some embodiments, radiating array structure 110 includes multiple transmission arrays composed of individual radiating elements. The transmission arrays may take a variety of forms and is designed to operate in coordination with the feed distribution module 116. Each of the transmission arrays may be an 8×16 array of unit cell elements 140, wherein each of the unit cell elements 140 has a uniform size and shape; however, some embodiments incorporate different sizes, shapes, configurations and array sizes. When a transmission signal is provided to the radiating structure, such as through a coaxial cable or other connector, the signal propagates through the feed distribution module 116 to the transmission arrays for transmission through the air.

An impedance matching element and a reactance control element may be positioned within the architecture of feed distribution module 116; one or both may be external to the feed distribution module 116 for manufacture or composition as an antenna or radar module. An impedance matching element works in coordination with a reactance control element to provide phase shifting of the radiating signal(s) from transmission arrays. The present invention is a dramatic contrast to the traditional complex systems incorporating multiple antennas controlled by digital beam forming. The present invention increases the speed and flexibility of conventional systems, while reducing the footprint and expanding performance.

As illustrated, there are multiple arrays for transmission, where at least one of the arrays is for transmission in the azimuth, or horizontal, direction, transmission array structure for azimuth 124, and the other is for receiving signal over the elevation of the array. The two antennas share a common feed 126 but have orthogonal radiation beams.

As illustrated in FIG. 5, an MTM radiating array structure 124 (or a portion of a structure) includes radiating elements 400 having a plurality of MTM cells arranged in an array of N×M unit cells (N rows, M columns) wherein for clarity and discussion herein each unit cell may be identified by a row, column index (i,j). The array can be a symmetric N×N array as well. Various configurations are possible based on the application, structure, physics and goals of the antenna structure, such as structure 124. Antenna structure 124 is part of an antenna system, that includes other modules, some of which are not shown in this drawing. Similarly, the specific shape of the unit cells may take on any of a variety of shapes that result in the characteristics and behavior of metamaterials and are not restricted to square or rectangular or any other regular shape.

Each of the unit cells in the antenna structure 124 may operate as part of the entire array collectively, individually or as part of a subarray of elements. The unit cells are associated or grouped specific unit cells into sub-arrays. The MTM antenna system determines where the radiated beam is to be directed, the shape of the beam and the dimensions of the beam. The beam may be a coarse or large bandwidth beam, a midsized beam or a small, narrow bandwidth beam depending on the situation, the object detected and the timing of the detection, as well as other considerations. The MTM antenna system may preconfigure one or more of the subarrays to anticipate a next action, or may use a default configuration, such as to start with a broad bandwidth which enables a faster scan capability or sweep time. For each sweep, the FoV is divided into portions, which may have consistent dimensions, different dimensions or may be dynamically adjusted. In some embodiments, the MTM antenna system selects specific directions to have a narrow beam, such as directly in front of the vehicle; other directions, such as on the edges of the FoV may be scanned with a wide beam. These and other design considerations are made by the designer in setting up the MTM antenna system, wherein some systems are flexible and configurable. In the illustrated example, the MTM antenna structure 124 may have several subarrays that are intended to direct the beam and form the desired radiation pattern.

Some other considerations for antenna applications, such as for radar antennas used in vehicles, include the antenna design, capabilities, and receiver and transmitter configurations. A typical electronic system with an antenna array consists of two or more antenna elements, beam forming network, and a receiver or transmitter. The beamforming network may consist of a Butler matrix or other antenna arrays combined with phase shifting elements. Many different antenna configurations can be utilized as an antenna element in the antenna array: simple dipole, monopole, printed patch design, Yagi antenna, and so forth. One of the primary goals for antennas mounted on/in the car is to achieve a compact and aesthetic design. Other goals relate to the type of communication signal used for the radar beam. One type of modulation used is Frequency Modulation Continuous Wave (FMCW), which is effective in radar applications, as radar does not need to pulse, but rather transmits continuously. As discussed above, the FMCW is a continuous carrier modulated waveform that is transmitted as a continuous periodic function, such as sinusoid, sawtooth, triangular and so forth. The sweep time, or sweep period, $T_s$, is the time for transmission of one period of the waveform. The signal transmitted during one sweep period is referred to as a chirp. There is a difference in the frequency of the transmit and receive signals that is referred to as the beat frequency, $b_f$. The range of the antenna, R, is the distance from the antenna to a detected object, and is a function of the sweep period, beat frequency, the speed of light, c, and the sweep bandwidth, $B_s$. A moving target induces a Doppler frequency shift that enables radar to detect the relative velocity of the target with respect to the antenna. The phase difference between the transmit and receive signals provides location information, while the frequency shift identifies a speed.

In the case of moving objects, the signal phase distortions may impact the performance of the antenna array. One way to offset such distortion is to use multiple subarrays at the Tx and Rx sides to filter out these impurities. Another way is to adjust the antenna calibration on-the-fly to reduce the phase distortion of moving objects.

Traditional phase shifting is used to control the beam of an antenna. Phased array antennas have multiple elements that are fed so as to have a variable phase or time-delay at each element and so that the beam scans from different angles. The multiple elements provide radiation patterns with lower sidelobes and enables careful beam shaping. The beam can be repositioned for more directed and efficient operation.

The present inventions provide an MTM antenna structure that provides phase shifting without the active elements required to change the phase, or in the traditional ways. The MTM antenna structures of various embodiments use the characteristics of the metamaterial shape and configuration to provide phase shift without the use of mechanical or electrical phase shifters.

The MTM antenna arrays of the present invention may be fed by a variety of configurations, such as a probe feed or a substrate integrated waveguide and so forth. In one example of an MTM antenna structure 1000, illustrated in FIG. 7, a signal source is provided as a probe input 1004, which may be coupled to a ground plane or feed layer 1002. The probe input 1004 supplies the source signal for the antenna 1000 to generate a modulated EM waveform. A second layer 1006 is positioned over the feed layer 1002. The second layer 1006 is made of a dielectric material and has an antenna structure 1008 configured thereon. This antenna structure 1008 is designed to receive the source signal and generate a relatively flat wave front to meet the MTM layer 1010. The antenna 1008 may be any of a variety of antennas, such as a dipole antenna, or any other antenna capable of generating a relatively uniform and flat wave front across the entirety of the second layer 1006, or antenna that is able to receive a radiated signal from layer 1006 and reradiate the received signal over the air. The ability to provide the signals to the MTM array or to individual subarrays and/or individual unit cells, enables the MTM antenna 1000 to radiate EM beamforms that are steerable. The MTM unit cells are controlled by changes to the reactance behavior of the MTM unit cells, such as through a variable capacitor or varactor coupled between the MTM structures. In some embodiments, at least one varactor is coupled between conductive portions of the layer 1010. In this way, the changes in control of the varactor modify the behavior of individual elements and therefore the behavior of the array of layer 1010. The varactor acts as a reactance controller, wherein a voltage applied to the varactor changes the reactance of the varactor, and specifically changes the capacitance and/or inductance of the varactor. As the varactor is coupled to at least on element of layer 1010, radiation beams from the element (or elements) is changed to steer the beam. Some embodiments include multiple radiating element layers, similar to layer 1010, and may include multiple intermediate layers, such as to achieve circuit routing and control.

Figure 8:
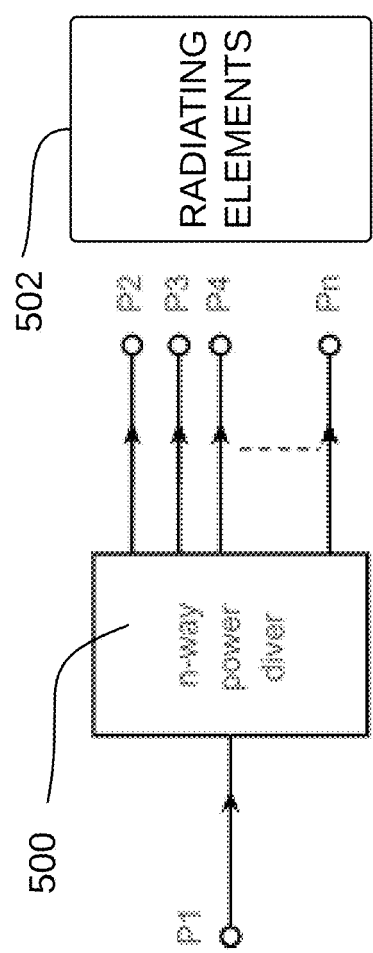

FIG. 8 illustrates a feed structure and configuration for radiating elements 502. The n-way power divider 500 receives an input signal P1 for transmission and has circuitry to divide P1 into (n−1) transmission paths, P2, P3, P4, . . . Pn. In some embodiments, the power is divided approximately equally into all the paths. In some embodiments, the paths are configured to have different power levels, such as to taper sides or achieve a desired result in transmission. As these paths feed to the radiating elements of an MTM array, they are correlated to the shape, sizing and control parameters of the radiating elements.

Figure 9:
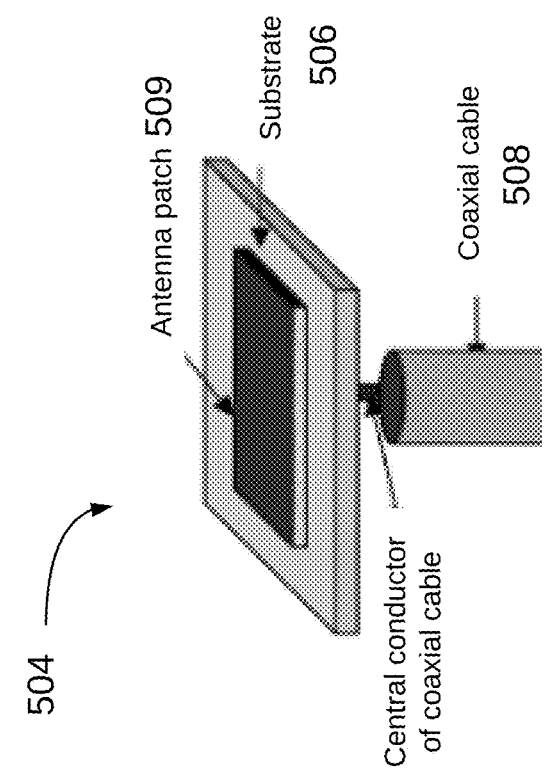

FIG. 9 illustrates another feed structure 504, wherein a coaxial cable 508 carries a signal to an antenna patch 509 positioned on a substrate 506. The antenna patch 509 is the radiating element through which the transmission beams are radiated. The substrate 506 may be a multi-layer configuration of conductive and dielectric layers. The antenna patch 509 is a conductive material that radiates on receipt of the transmission signal from the coaxial cable 508. The configuration may be to present the signal directly from an opposite side of the antenna patch 509 or may be provided from a side configuration. In this way, a signal is provided from below the antenna patch 509 from which the signal radiates. The antenna patch 509 may be part of an MTM element, wherein additional conduction portions may be configured.

Figure 10:
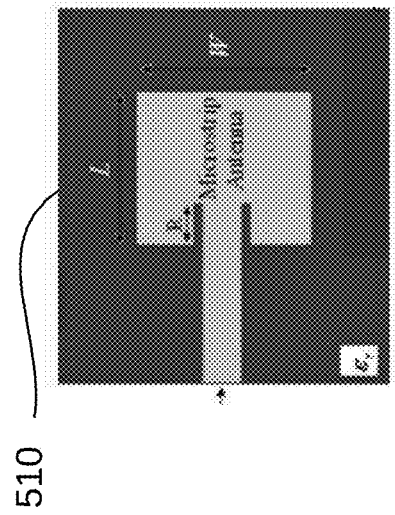
FIGS. 8-13 illustrate antenna feeds, according to embodiments of the present invention.
Figure 11:
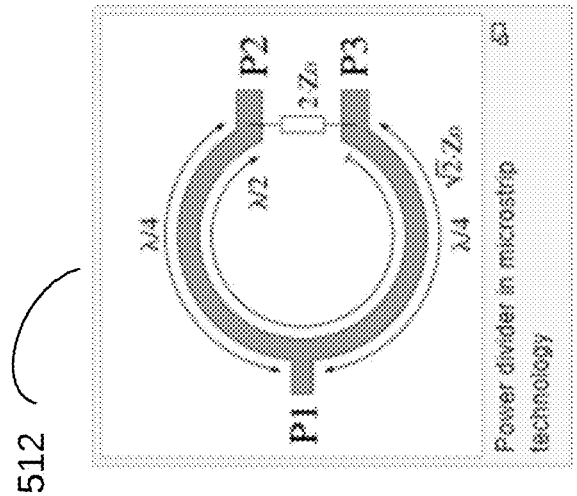

There are a variety of configurations and combinations of radiating elements and feed sources, such as microstrip antenna 510 which is side-fed by a microstrip of FIG. 10. Another configuration is illustrated in FIG. 11 having a power divider micro-strip antenna element 512. In this example, the source signal P1 is divided into power paths P2 and P3. This may be one of multiple elements 512 in a feed network. In the example illustrated, the two outer perimeter paths of the power divider 512 are each designed for a frequency, f, wherein the length corresponds to ¼ the wavelength (λ/2) off. The inner perimeter path is designed to have a length corresponding to ½ the wavelength (λ/2). The impedance of each path of the power divider 512 is approximately $\sqrt{2}*Z_o$, where $Z_o$ is a given impedance value, and the output provides $2*Z_o$.

Figure 12:
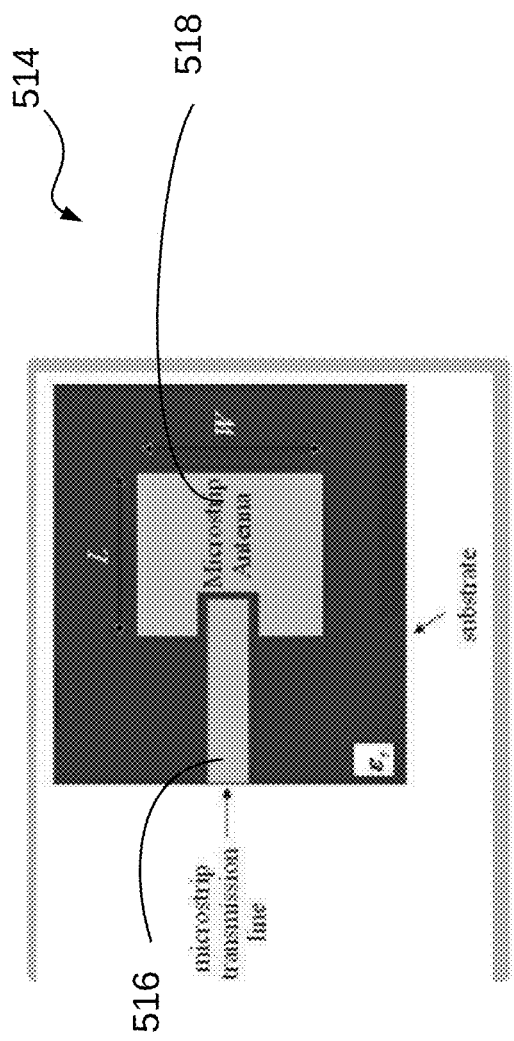

FIG. 12 illustrates an example of a feed structure 514 wherein a microstrip transmission line is coupled to a microstrip antenna element by its proximity thereto. Here the radiating element, or microstrip antenna, is fed from the side. The feed structure 514 may be fabricated on a printed circuit board (PCB) and is used for microwave frequencies. The feed structure 514 may incorporate a patch of metal of various shapes which are positioned on one side of the PCB, which is referred to as the top herein but is not limiting in position.

Figure 13:
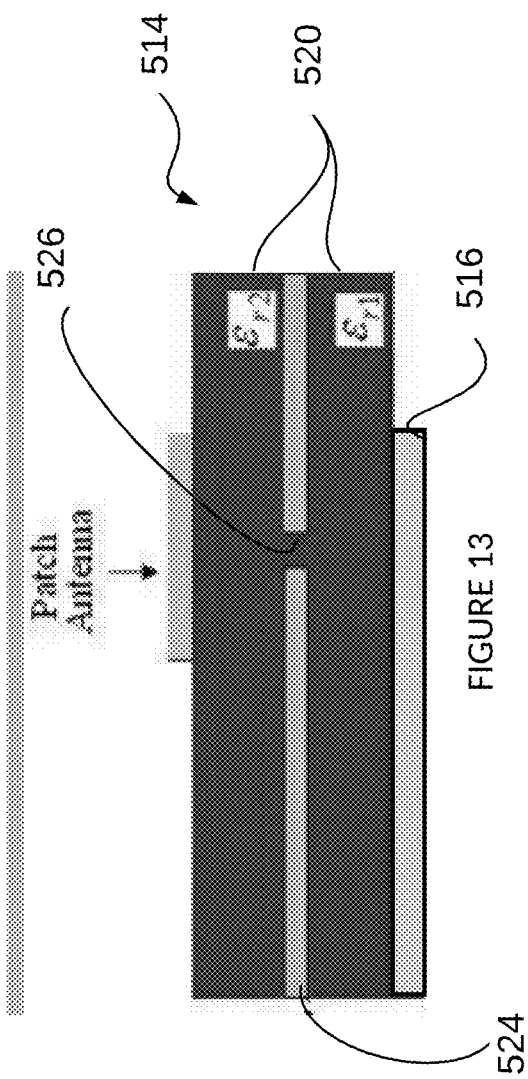

In FIG. 13, illustrates a perspective view of an embodiment of an antenna structure 514 is fed by microstrip transmission line 516. The signals are input to the antenna structure from any of a variety of sources. In some embodiments, the source includes a feedback loops in the antenna circuitry (not shown). The microstrip transmission line 516 is electromagnetically coupled to a microstrip antenna patch 518. This configuration is referred to as an aperture coupled feed patch antenna. In some embodiments, the antenna structure 514 is built on a substrate layered configuration having multiple layers of dielectrics coupled between conductive layers, or proximate a conductive layer, wherein the transmission line 516 provides input signals from a first layer to microstrip antenna patch 518 through an aperture 526 positioned in a conductive layer proximate the patch antenna structure 518. There are multiple dielectric layers 520. The patch antenna structure 518 may be a MTM structure, wherein the antenna structure 514 is one of multiple structures to form an array of elements. The feed 516 provides the signals in a plane that is approximately parallel to the conductive layer 524 and the patch antenna structure 518.

Figure 14:
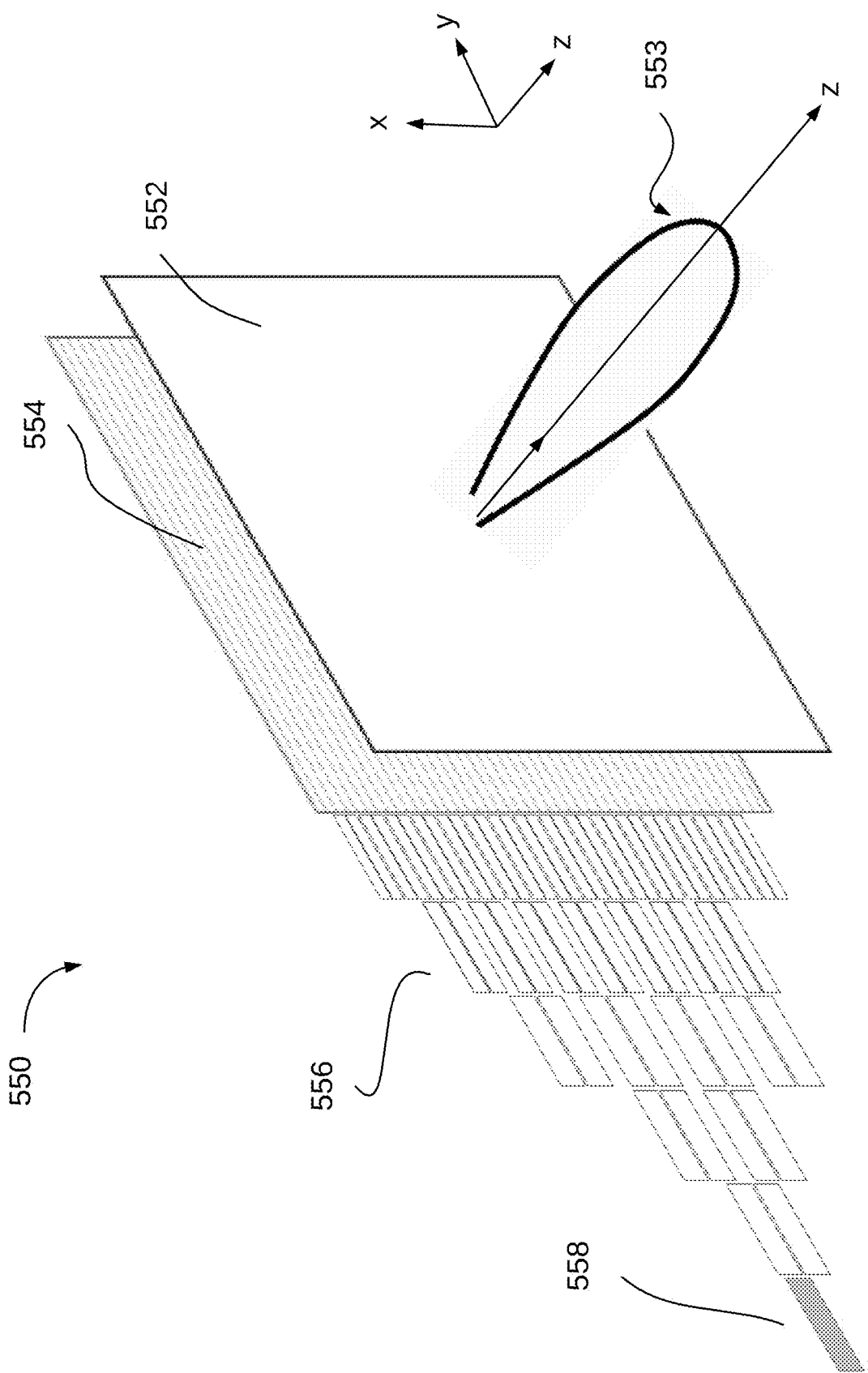
FIG. 14 illustrates an antenna structure, according to embodiments of the present invention.

FIG. 14 illustrates a feed structure having a side-fed MTM array 552, wherein the side-fed guide includes an input port 558, such as a coaxial cable, coplanar wave (CPW) guide or substrate integrated waveguide (SIW), that feeds a distribution network 556, that may be a power divider circuit. The distribution network 556 feeds a layer of transmission array 554, which propagate along the y-direction or length of the layer 554. In this way, the signal is received at input 558 and fed to a distributed feed network 556 having multiple stages or levels. The configuration illustrated may incorporate a variety of other circuits, structures or components to enable smooth operation, such as to provide reactance matching of the various levels and distribution points, including coupling to the layer 554 and individual transmission lines formed therein. The distributed feed network may take any of a variety of forms to distribute an input signal to a plurality of transmission lines in a transmission array.

The layer 554 is positioned proximate MTM layer 552 such that signals propagate through layer 554 and are received at MTM layer 552 for radiation in the z-direction. The feed network distribution 556 is illustrated as a multi-layer, equally-divided structure that feeds a plurality of transmission lines of layer 554. Each of the divided paths of distribution network 556 feeds a transmission line, referred to herein as a super element, of transmission array 554. The super elements are arranged such that a signal propagates through from the distribution network 556 to an opposite end of the layer 554. Each super element has a plurality of discontinuities positioned along its length. (An example of super elements is illustrated in FIG. 5.) These discontinuities may be slots positioned with the super element that enable the propagating signal to travel through the slot forming electromagnetic radiation transmissions that feed another layer 552, which is proximate the transmission array 554 and is exposed to the air or free space. An example of an MTM unit cell 29 is illustrated in FIG. 15, having conductive portions 23, 25, gaps 27 and reactance control means 21. The beam form and direction of the radiated signal from MTM layer 552 is formed by an MTM array of unit cells which are controlled to change the resultant beamform. The MTM layer 552 may also output multiple beamforms by allocating subarrays or by controlling the parameters of the unit cells. The present embodiment provides the feed distribution network 556 in a layer of substrate underlying or proximate the MTM layer 552, which may incorporate one or more layers of MTM arrays. In other embodiments, the feed distribution network 556 may couple to the layers 554, 552 from an approximately perpendicular position or from an angled position with respect to the layers 554, 552. As illustrated, the signal is receive in the y-direction, propagates along a feed distribution network 556 that is spread across the x-direction. The transmission propagates from the feed distribution network 556 to the transmission array 554. It then radiates through the slots of transmission array 554 to the MTM layer 552 as a beamform 553 radiating in the z-direction as illustrated in FIG. 14. The beamform 553 is directed into the z-direction and approximately parallel to the z-axis, which is referred to as the boresight direction. Changing the reactance control elements, such as reactance control means 21 of FIG. 15 discussed hereinbelow, results in a change in the directivity of the beamform 553. This may change the directivity in the azimuth (x-direction), elevation (y-direction) or both.

The inventions described herein find application in a variety of situations and uses, including automotive control, wireless communication, electronic tracking devices, security devices, medical devices, and so forth. FIG. 15 illustrates an example of a system 9 for a radar system in a vehicle control system. Included in system 9 is a radiating structure 10 for generating, transmitting and receiving transmission signals. The radiating structure 10 includes a feed distribution module 12, a transmission array structure 14 and a radiating array structure 16. While these modules are described separately, the functions and operations of the individual modules and elements may be combined or moved within the radiating structure 10 for various embodiments. The configuration illustrated is provided for clarity of understanding. Within radiating structure 10, a radiating array structure 16 includes a plurality of unit cell elements 20, each of which may be a frequency-selective structure, a MTM unit cell or combination. From these elements 20 transmission waves radiate into the air or external environment. The unit cell elements 20 of the radiating array structure 16 are arranged in a lattice formation having a similar shape and orientation for each of the unit cells. Alternate embodiments may implement a variety of different unit cells that are positioned to achieve a desired result. In some embodiments, the unit cell element 20 is as illustrated having a conductive patch 23 coupled to a perimeter conductive loop 25, wherein one or more reactance control means 21 are coupled therebetween. A gap 27 is provided between the loop 25 and the patch 23, wherein gap 27 may be filled with a dielectric material, air or other material that separates the conductive portions within the unit cell 20. To control the reactance control means 21 the system 9 includes various controls, including an antenna controller 6. The system also includes a transceiver 8, a transmission signal controller 7, and a central processing unit 2.

The system operates to control the antenna functions within system 9 and to analyze and respond to received information. Information is received through all or a portion of radiating array structure 16 and is sent to transceiver 8 for further processing. That processing may involve an artificial intelligence (AI) module 5, which receives data and determines object detection, object identification, object classification, action prediction and/or other environmental conditions based on the data. Some systems may include multiple radiating structure 10, such as one for receive and one for transmit. Some systems use a radiating structure 10 in a duplex mode for both transmit and receive operation. Some systems allocation subarrays within a radiating array structure 16 where one subarray is for transmit and one is for receive.

The system 9 is adapted to work with other modules, controls and systems within a vehicle through interfaces and messaging such as the interface to sensor fusion 3 and others (not shown). A memory storage 8 may be used to store data and algorithm specifics used in the AI module 5. In some embodiments, an AI module 5 is a deep learning neural network that is a set of algorithms to recognize patterns, such as those that may be present in the received data. The AI module 5 acts on received data, and may also incorporate transmission data and parameters, to identify, group, classify, label and so forth, to better understand the data. The neural network extracts features from the data without the extended latency of traditional logical operations. The output of the neural network is referred to as its perception. In a real-world environment, the AI module 5 perceives the world as a human would; and is able to recognize a tree from a car from a truck. The combination of the fast scanning ability of the system 9 and the resolution of the radiating array structure 16, along with the ability to quickly beam shape and beam switch using the reactance control element 15, provides the AI module 5 with significant information at a speed that enables real time navigation of the real-world environment.

The feed structure of FIG. 14 may be used to build the radiating structure 10 of FIG. 15, wherein the feed distribution module 12 may include a configuration as antenna structure 550, wherein the layers are positioned approximately parallel to the radiating array structure 16 of layer 552. There may be any number of intermediate or additional layers to such structures. Some layers are used for routing, some for isolation, some for additional beamforming, shaping and steering and so forth. In some embodiments, the layers and components are positioned in a variety of directions and configurations. The ability to build a substrate having multiple layers optimizes the size and dimensions of the radiating structure 10.

Figure 16:
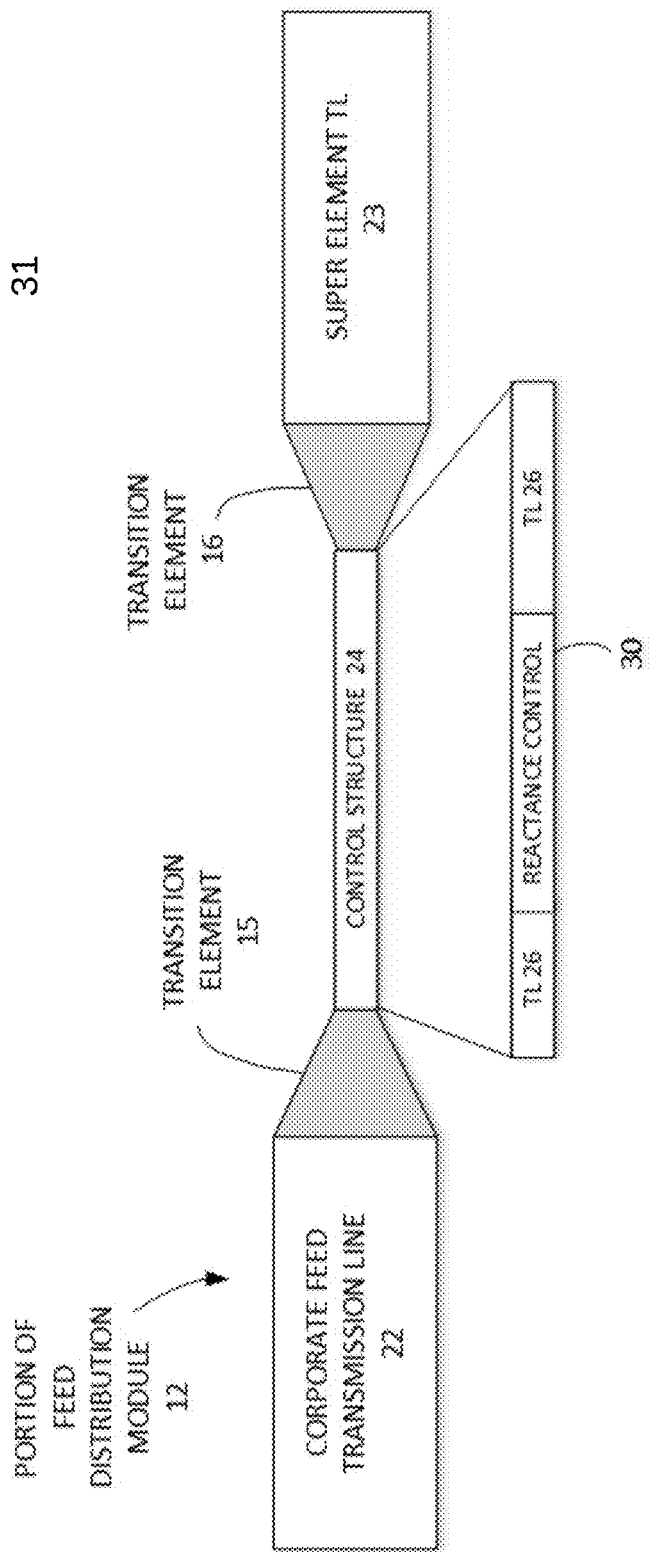
FIG. 16 illustrates a control structure for a feed distribution network, according to embodiments of the present invention.

Continuing with FIG. 15, the reactance control element 15 may be implemented as a structure illustrated in FIG. 16. The portion of feed distribution module 12 illustrated is coupled to the super element transmission line 23, which is part of the transmission array structure 14. The control structure 24 is positioned between the corporate feed transmission line 22 and the super element transmission line 15. The corporate feed transmission line is interrupted with a microstrip portion to which the reactance control 30 is coupled. The microstrip control structure 24 has dimensions that are much smaller than the corporate feed transmission line 22 and the super element transmission line 23, and therefore transition elements 15, 16 enable signals to flow through these with minimal loss and distortion.

As illustrated, the corporate feed transmission line 22 is a portion of feed distribution module 12 of FIG. 15. Between the corporate feed transmission line 22 and the super element transmission line 23 is a control structure 24 coupled to, or integrated into, a microstrip. There are transition elements 15, 16 that couple on each end of the control structure 24. The transition elements 15, 16 assure matching between the transmission lines 22, 23 and the microstrip 24. The transmission array structure 14 includes the super elements, such as super element 31, which each have a plurality of discontinuities or slots, such as slot 17. The connect 13 includes transition elements 15, 16 and control structure 24.

Figure 17:
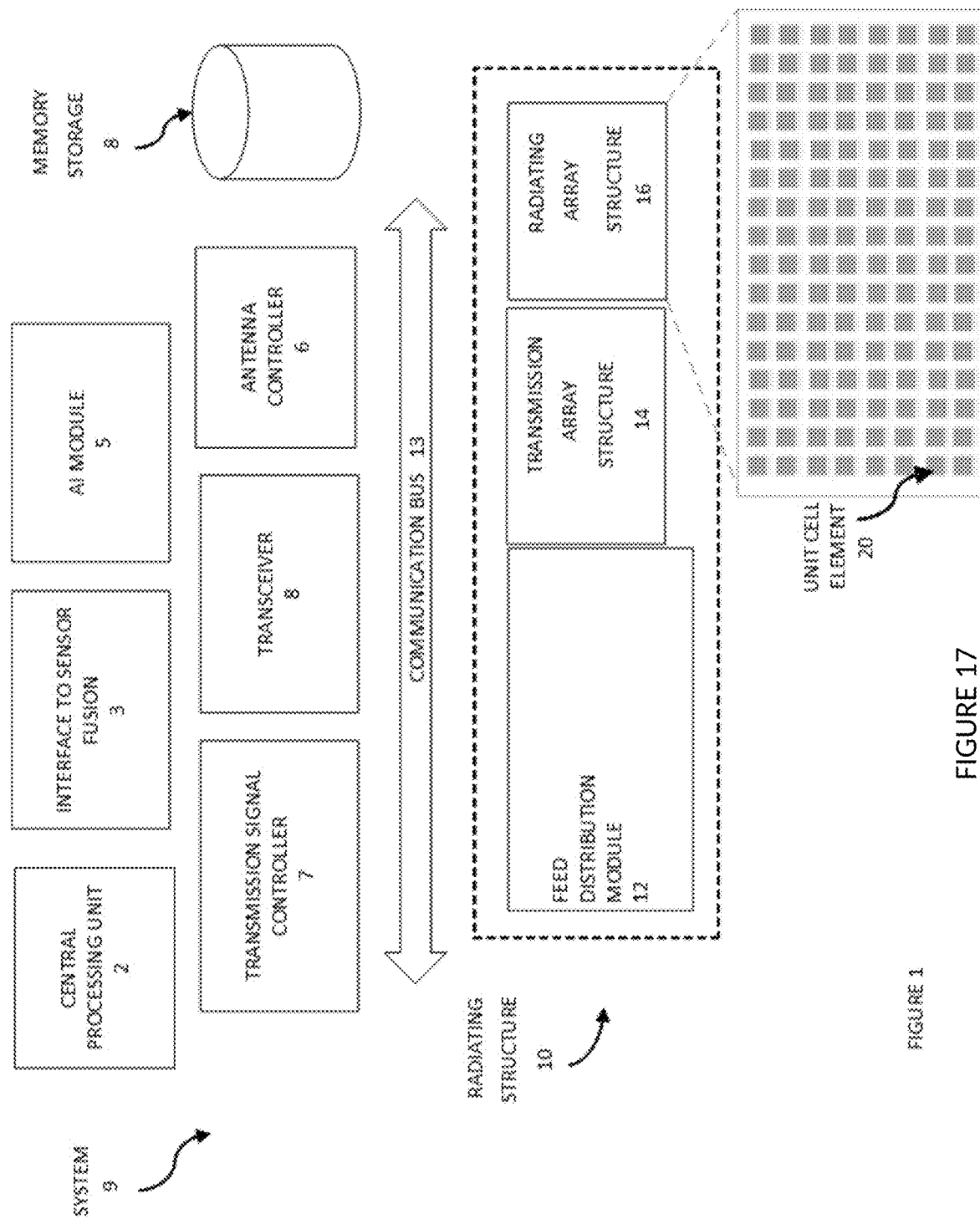
FIG. 17 illustrates a system having a feed distribution network for a radar sensing system having fixed beams, according to embodiments of the present invention.

FIG. 17 illustrates an alternate embodiment of system 9, where the radiating array structure 16 includes an array of unit cells, wherein the radiating array structure 16 has a plurality of fixed beams. The radiating array structure 16 is allocated as a plurality of subarrays, wherein one or more subarrays are used for fixed transmission beams and one or more subarrays are used to receive signals. The subarrays are controlled so as to combine one transmission subarray with one receive subarray to detect objects in a specific location. Any number of combinations is possible given the number of unit cell elements 20, the number of subarrays allocated and the number of transmit and receive subarrays.

There are a variety of feed structures that may be implemented to provide signals to an MTM array of elements, from which the signal is transmitted over the air. Each solution provides different benefits and is applicable in different situations.

FIG. 18 illustrates an example of an antenna system incorporating the present inventions. The antenna system 600 includes an antenna system 602 coupled to an antenna control module 610 that includes multiple functions defined in FIGS. 16, 17. The system includes a microprocessor 616 coupled to waveform generator 614 and to transceiver 612. The control module 610 has multiple transmit ports, Tx1 and Tx2 for transmission signals and multiple receive ports, Rx1 through Rx4 for receive signals, wherein antenna system 602 is coupled to transmit and receive ports. The antenna system 602 may be any of the various embodiments disclosed herein having a transmission array proximate a radiating array, wherein the radiating array has a plurality of MTM elements.

The present invention provides a feed structure for an MTM array of elements that may be divided into subarrays that act as independent antennas. These solutions provide a signal to a side of the MTM element opposite the direction of transmission. Some embodiments provide a waveguide feed structure that radiates a signal to one side of the MTM element, whereupon the MTM element radiates that signal from the other side along with a phase shift. The phase shift may be adjusted by reactance control of the individual MTM elements, such as by way of a varactor or other structure to change the behavior of an MTM element.

As illustrated herein, there may be multiple MTM array layers configured proximate each other. The layers include conductive layers with one more dielectric layers sandwiched there between. MTM structures are configured or patterned on the conductive layer and radiate signals received from a transmission array. Signals propagate along the paths of the transmission array which has a plurality of discontinuities through which the signal radiates to the MTM structures. This configuration enables beam steering, beam shaping capabilities for scanning, such as for radar in a vehicular application.

The invention claimed is:

1. An antenna system, comprising:
a metamaterial array of unit cells; and
a feed layer arranged as a different layer than a layer of the metamaterial array of unit cells, the feed layer comprising:
an input port;
a distributed feed network of transmission lines configured to divide a signal received at the input port; and
a transmission array coupled to a first side of the distributed feed network, the transmission array having a plurality of transmission lines having a plurality of discontinuities positioned along a length of the plurality of transmission lines,
wherein when the signal propagates through the plurality of discontinuities, an electromagnetic radiation transmission is formed that radiates onto the metamaterial array of unit cells.

2. The antenna system as in claim 1, further comprising:
a reference substrate layer; and
a dielectric layer positioned between the feed layer and the reference substrate layer.

3. The antenna system as in claim 1, wherein the discontinuities are slots in a conductive portion of the feed layer.

4. The antenna system as in claim 3, wherein the slots are rectangular with a longer side positioned along a length of the transmission lines.

5. The antenna system as in claim 4, further comprising a plurality of irises positioned relative to at least one of the slots.

6. The antenna system as in claim 5, further comprising:
a transceiver module coupled to the feed layer; and
an object detection module coupled to the transceiver module and adapted to detect an object in a field of view of the antenna system as a function of received signals.

7. The antenna system as in claim 6, wherein the object detection module is an artificial intelligence (AI) module adapted to classify a detected object.

8. The antenna system as in claim 1, wherein the antenna system is a radar system, and the antenna system further comprises:
a transmitter adapted to generate transmit frequency modulated continuous wave (FMCW) signals; and
a receiver, comprising:
a mixer adapted to compare transmitted FMCW signals to received FMCW signals.

9. The antenna system as in claim 1, further comprising a gap positioned between the metamaterial array of unit cells and the feed layer.

10. The antenna system as in claim 1, wherein the metamaterial array of unit cells comprises multiple layers of metamaterial unit cells.

11. The antenna system as in claim 1, wherein the metamaterial array is approximately perpendicular to the distributed feed network.

12. The antenna system as in claim 1, wherein the metamaterial array is approximately parallel to the distributed feed network.

13. The antenna system as in claim 1, further comprising:
a second distributed feed network coupled to a side of the transmission array.

14. The antenna system as in claim 1, wherein the transmission array comprises by a plurality of vias defining the transmission lines.

* * * * *